(12) United States Patent
Manus

(10) Patent No.: US 7,726,670 B2
(45) Date of Patent: Jun. 1, 2010

(54) COLLAPSIBLE GOLF TROLLEY, AND A WHEEL STRUCTURE FOR A MOBILE APPLIANCE

(75) Inventor: George Manus, Turre (ES)

(73) Assignee: Nordict A/S, Hellerup (DK)

( * ) Notice: Subject to any disclaimer, the term of this patent is extended or adjusted under 35 U.S.C. 154(b) by 752 days.

(21) Appl. No.: 10/592,863

(22) PCT Filed: Mar. 17, 2005

(86) PCT No.: PCT/DK2005/000187

§ 371 (c)(1),
(2), (4) Date: Jan. 26, 2007

(87) PCT Pub. No.: WO2005/087568

PCT Pub. Date: Sep. 22, 2005

(65) Prior Publication Data

US 2008/0246256 A1     Oct. 9, 2008

Related U.S. Application Data

(60) Provisional application No. 60/553,557, filed on Mar. 17, 2004.

(30) Foreign Application Priority Data

Mar. 17, 2004   (DK) ............................... 2004 00426

(51) Int. Cl.
*B62B 1/12*     (2006.01)
*A63B 55/08*    (2006.01)

(52) U.S. Cl. .............. 280/47.24; 280/47.26; 280/47.23; 280/47.18; 280/38; 206/315.3

(58) Field of Classification Search ................. 280/638, 280/35, 639, 38, 47.131, 47.17, 47.18, 47.23, 280/47.24, 47.26, DIG. 6; 206/315.3
See application file for complete search history.

(56) References Cited

U.S. PATENT DOCUMENTS 2,837,346 A * 6/1958 Chambless .................. 280/37
2,857,168 A * 10/1958 Neaverson et al. .......... 280/652
3,719,247 A   3/1973 Hollis (Continued)

FOREIGN PATENT DOCUMENTS

DE           94 16 766 U     12/1994

(Continued)

*Primary Examiner*—Paul N Dickson
*Assistant Examiner*—John R Olszewski
(74) *Attorney, Agent, or Firm*—Birch, Stewart, Kolasch & Birch, LLP

(57) ABSTRACT

A collapsible golf trolley comprises a frame (176, 276) defined by at least two, preferably four, frame members (171, 172, 173, 174, 203), and a wheel structure (122, 222). The frame members are pivotally interconnected at hinges (106; 177, 205), whereby in a first configuration, the frame members define a casing (100, 200) for the wheel structure parts, the casing having a length which is shorter than the sum of the lengths of each of the frame members. In a second configuration, the frame members coextend in a longitudinal direction to define the frame (176, 276). There is further provided a collapsible wheel structure having arms (150,152,258,252) defining pivotally interconnected arm sections (154,156,158, 160; 254,256,258,260) which, in a first, folded configuration define a partial cylindrical shape, and which in a second, unfolded configuration form an S-shape.

36 Claims, 21 Drawing Sheets

U.S. PATENT DOCUMENTS

| | | | | |
|---|---|---|---|---|
| 3,738,677 A * | 6/1973 | Renock | ................ | 280/37 |
| 5,074,576 A * | 12/1991 | Finlay | ................ | 280/645 |
| 5,769,220 A * | 6/1998 | Hong | ................ | 206/315.3 |
| 5,879,022 A * | 3/1999 | Winton | ................ | 280/655 |
| 5,967,543 A | 10/1999 | Taylor | | |
| 6,050,592 A * | 4/2000 | Kim | ................ | 280/652 |
| 6,186,520 B1 * | 2/2001 | Barten | ................ | 280/30 |
| 6,193,264 B1 | 2/2001 | Seon et al. | | |
| 6,425,589 B1 | 7/2002 | Wu et al. | | |
| 6,659,477 B2 * | 12/2003 | Jung | ................ | 280/47.26 |
| 2002/0125667 A1 | 9/2002 | Sciulli | | |
| 2004/0011929 A1 | 1/2004 | Haugen | | |

FOREIGN PATENT DOCUMENTS

| | | |
|---|---|---|
| DE | 295 03741 U1 | 7/1995 |
| DE | 101 29 724 A1 | 1/2003 |
| DE | 102 17 764 A | 10/2003 |
| GB | 662 882 A | 12/1951 |
| GB | 764 085 | 12/1956 |
| GB | 2 096 546 A | 10/1982 |
| GB | 2 309 438 A | 7/1997 |
| GB | 2 401 554 A | 11/2004 |
| WO | WO-92/18206 A | 10/1992 |
| WO | WO-99/36304 A | 7/1999 |
| WO | WO-99/39961 A | 8/1999 |
| WO | WO-2004/035150 A1 | 4/2004 |
| WO | WO-2005/087568 A2 | 9/2005 |

* cited by examiner

COLLAPSIBLE GOLF TROLLEY, AND A WHEEL STRUCTURE FOR A MOBILE APPLIANCE

This National Phase application claims priority under 35 U.S.C. 119(e) to U.S. Provisional Application No. 60/553,557 filed on Mar. 17, 2004 and under 35 U.S.C. 119(a) to Patent Application No. PA 2004 00426 filed in Denmark on Mar. 17, 2004. Both of these prior applications are hereby expressly incorporated by reference into the present application.

TECHNICAL FIELD

The present invention relates to a collapsible golf trolley. In an independent aspect, the invention also relates to a collapsible wheel structure for a mobile appliance, such as a golf trolley.

BACKGROUND OF THE INVENTION

Throughout the past decades, golf has become an increasingly more popular sport. Today, thousands of players all over the world play golf on a regular basis. As it is well known, a player's golf clubs and other equipment is normally stored and carried in a golf bag. To facilitate handling and conveyance of golf bags, there has been developed golf trolleys having a frame for supporting the golf bag, two wheels for supporting the frame, and a handle allowing a player to draw the golf trolley with a bag supported thereby. Many golf players who own their own golf clubs, bags and trolleys, have experienced that such equipment takes up a considerable amount of space. This poses not only a domestic storage problem, but also a problem related to transportation of the equipment from, e.g., a player's home to a golf course, for example when the equipment is to be fitted into the trunk of a car. With the growing popularity of compact, low-fuel consumption cars, this problem becomes still more significant.

Therefore, there exists a need for a collapsible golf trolley which occupies less space when collapsed than in its unfolded working configuration. Various collapsible golf trolleys have been proposed in the prior art. For example, U.S. Pat. No. 6,193,264 B1 discloses one such golf trolley, which comprises a collapsible frame device. The frame device includes a number of parts which, in one configuration, are assembled to form the golf trolley, and which in another configuration, are dismantled.

Though the golf trolley of U.S. Pat. No. 6,193,264 is an improvement with respect to non-collapsible golf trolleys, it does, however, suffer from the disadvantage that assembling and dismantling of the various parts of the frame is rather complex and time-consuming. It is therefore an object of embodiments of a first aspect of the present invention to provide a collapsible golf trolley, which is less than complex, and which can be more easily assembled and dismantled. It is a further object of embodiments of the invention to provide a golf trolley which occupies a reduced volume in its collapsed (folded) configuration. It is an object of embodiments of a second aspect of the invention to provide a collapsible wheel structure for a mobile appliance, which wheel structure is easy to assemble, easy to unfold and collapse, and which, in its collapsed or folded configuration occupies a reduced volume.

SUMMARY OF THE INVENTION

In a first aspect, the invention provides a collapsible golf trolley, comprising:
a frame defined by at least two frame members, and
a wheel structure comprising a plurality of interconnectable wheel structure parts,
the at least two frame members being pivotally interconnected, whereby in a first configuration the two frame members define at least part of a casing for the wheel structure parts, the casing having a length which is shorter than the sum of the lengths of each of the frame members, and whereby in a second configuration the two frame members coextend in a longitudinal direction to define said frame.

It will be appreciated that the provision of a casing, constituted by at least some of the frame members allows the trolley to be conveniently stored, as no separate container is required for the wheel structure parts. Preferably, all other parts of the golf trolley may be stored in or constitute part of the casing. It will further be appreciated that the casing may be significantly shorter than the total length of the golf trolley, as not all the frame members co-extend in the first, collapsed configuration. On the contrary, in embodiments, the frame members may define side walls of the casing, or they may be rolled or wound up to form a essentially cylindrical or polygonal casing with at least some of the frame members defining an outer, essentially cylindrical wall of the case. In one embodiment, the frame members are essentially arc-shaped when seen in a transverse cross-section, in which case the casing has a curved, preferably, circular circumference. At the same time, the arc-shape of the frame members may define a concave support for the golf bag in the unfolded state of the golf trolley, i.e. In the second configuration of the frame members. In other embodiments, the frame members may define linear segments in the transverse cross-section, so that the circumference of the casing defines a polygonal shape. In such embodiments, the frame members and optionally also supporting legs for the wheels may have triangular cross-sectional shapes, whereby, in the first configuration, the triangular parts extend outwardly from a central point, when seen in an end view, so that respective base lines of the triangles define the polygonal outer surface of the casing. In embodiments, in which the frame members are rolled or wound in the first, i.e. folded configuration to form an essentially cylindrical casing, the frame segments may define at least one arc-shaped surface facing inwardly in the folded configuration. The arc-shaped surface may define a radius of curvature essentially equal to the radius of the wheels, so that the wheels may be conveniently accommodated in the casing. The wheels may define end surfaces of the cylindrical casing with the remaining wheel structure parts being accommodated in the casing between the wheels. Such an arrangement is in particular useful in embodiments, in which the casing or at least an inner wall thereof is essentially cylindrical, but it is also useful in other embodiments, e.g. in case of a polygonal shape of the casing.

In order to allow for a low-weight wheel structure, the outer boundaries of the casing may be defined by the frame members and, optionally, also by the wheels, with suspension elements for the wheels being accommodated in the casing. For example, an outer wall of the casing may be defined by the frame elements, and optionally the wheels may define end portions of the casing.

There may be provided locking means for mutually securing the frame members in the first and/or second configuration, for example simple mechanical means, such as a sliding pin arranged on one of the frame members to slide into a groove on another one of the frame members, spring-biasing means, hooks for engagement with eyelets, etc.

In one embodiment, the frame members define upper and lower parts of the casing in the first configuration. For example, there may be provided at least four frame members, a first and a second of which, in the first configuration, define a lower part of the casing, a third and a fourth frame member defining an upper part of the casing in the first configuration, in which the upper and lower parts are arranged on top of each other. The upper and lower parts may be detached from one another and placed in series in mutual extension to define the frame or a part thereof. In the embodiment comprising four or more frame members, the frame members constituting the upper part may be detached from one another and placed in a co-extending fashion. Likewise, the frame members constituting the lower part may be detached from one another, and accordingly, the frame may, in the second, unfolded configuration of the frame members, comprise four or more co-extending frame members. It is within the scope of the invention that the upper and lower parts of the casing need not be defined by the same number of frame parts. For example, one of the casing parts may be defined by just a single frame member, and the other one of the casing parts may be defined by a plurality of frame members. From the above discussion, it will be understood that the length of the frame in the second, unfolded configuration is normally at least twice, and preferably at least three or four times, the length of the casing, i.e. the length of a single frame member.

To conveniently join the frame members together, the lower part of the casing may be pivotally connected to the upper part around a first hinge arranged at one end of the casing. Accordingly, the casing may unfold from the first configuration into an intermediate configuration in which the frame members define a completely or partially unfolded state of the trolley, the length of the trolley in the partially unfolded state being substantially twice the length of the casing. In case each of the upper and lower parts of the casing is defined by just a single frame member, the intermediate state also constitutes the final, second configuration of the frame members. If, however, the upper and/or lower part of the casing is defined by more than one frame member, the intermediate state is not the final, second configuration, as further unfolding or assembling is required in order to arrive at the second configuration.

In the present context, the terms "folding" and "unfolding" do not necessarily imply a pivoting action. Folding and unfolding may, within the scope of the present disclosure, also be performed by simple mutual dismantling and re-assembling of parts.

In one embodiment comprising four frame members, a first and second one of which define a lower part of the casing, and a third and fourth one of which define an upper part of the casing, the first and third frame member define a left part of the partially unfolded frame in the intermediate configuration. Likewise, the second and fourth define a right part of the partially unfolded frame. The left and right parts may be pivotally interconnected around a second hinge arranged at one end of the partially unfolded frame, so that the partially unfolded frame may unfold from the intermediate configuration into the second configuration. Thus, unfolding of the four frame members requires three unfolding actions: first, the upper and lower part of the casing is unfolded to the intermediate position, then the first and third frame members are unfolded to co-extend in the longitudinal direction, and finally, the second and fourth frame members are unfolded to co-extend with the first and third frame members. Locking means are preferably provided for interlocking the frame members in the second configuration, and optionally also in the intermediate configuration.

At least one of the frame members, and preferably all of them, may include an arc-shaped supporting member defining an end portion of each frame member. The arc-shaped supporting member(s) may constitute end surfaces of the casing in the first, collapsed configuration, in which the frame members define the casing.

The frame members may be solid and made from plates of plastics or metal materials. However, in order to save weight, the frame members may alternatively be defined by parallel, longitudinally extending frame member portions which are mutually joined. For example, each of the frame members may comprise a plurality of rods which are mutually secured by one or more of the arc-shaped supporting members which extend transversely to the rods. In that case, the enclosure of the casing is constituted by the rods, the casing thereby appearing as a cage, the end surfaces of which are constituted by the arc-shaped supporting members. Alternatively, the end surfaces of the cage may be defined by the wheels.

There may further be provided at least one golf-bag supporting members, which may detachably or non-releasably fixed to one or more of the frame members. The golf-bag supporting member, which may be accommodated in the casing in the first configuration of the frame members, may serve to support a golf bag to be supported by the golf trolley. Accordingly, the golf-bag supporting member may extend over a larger angle than each of the frame members and define a concave support for an outer surface portion of the golf bag. In order to provide a secure fixation of the golf-bag in relation to the frame members, there is preferably provided two golf-bag supporting members, a lower one of which also provides a base support for the golf bag.

A handle may be pivotally connected to one of the frame members, so that the handle, in one configuration, extends in the longitudinal direction, and in another configuration extends in a transverse direction, so that the handle may define an end surface of the casing in the first configuration of the frame members, when the handle extends in the transverse direction.

As a further feature, the golf trolley of the present invention may comprise a supporting wheel which is releasably connectable to an end portion of the frame remote from the handle. For example, the supporting wheel may be mounted on a mounting system, which e.g. comprises two mounting members, supporting a pivot pin for the supporting wheel, the mounting system being releasably connectable to the frame. In one embodiment, the supporting wheel extends essentially the width of the frame in the transverse direction.

The wheel structure parts preferably include at least two wheels, each having an outer diameter which is sufficiently small to allow the wheels to be accommodated in the casing. In those embodiments, in which the casing or at least an inner wall thereof defines the shape of a cylinder, the outer diameter of the wheels is preferably smaller than or equal to the inner diameter of the cylinder, so that the wheels may be accommodated in the casing. Preferably, inwardly facing parts of the essentially cylindrical casing are curved to conform to the shape of the wheels, the inner diameter of the cylindrical casing preferably defining a radius of curvature which is essentially equal to the diameter of the wheels for compact storage in the folded configuration.

To minimize the spatial extent of the golf trolley in its collapsed state, the wheel structure is preferably collapsible. More specifically, the collapsible wheel structure may have a first, collapsed configuration, in which the wheel suspension structure and the wheels may be accommodated in the casing, and a second, unfolded configuration, in which the wheel structure constitutes a support for the frame. The wheel suspension structure may be detachably or non-releasably secured to one or more of the frame members at a position, which in the second, unfolded configuration of the frame members, provides a balanced support for the golf bag, so that the trolley does not tilt over under the weight of the golf bag and its contents.

The wheel suspension structure may have two supporting arms extending from and being interconnected at a centre element, such as a centre hinge. Thus, the wheel structure is preferably symmetrical around a central plane in the unfolded configuration, the central plane thereby defining a symmetry plane of the wheel structure and of the frame. In order to provide for a densely foldable structure, each arm may comprise a first section which, in the unfolded configuration, is proximal with respect to the central plane, and a second section which, in the unfolded configuration, is distal with respect to said central plane. In other words, the two sections of each arm may essentially extend in an end-to-end fashion in the unfolded configuration, and they may extend in parallel and/or in an overlapping manner in the folded configuration.

While the centre element serves to interconnect the fist arm sections of the two arms, it may also contribute to the attachment of the wheel structure to the frame. For example, each of the first arm sections may define a groove for engaging a portion of the frame, such as a protrusion provided on the frame, or, more preferably, for engaging one of the rods of the frame in case the frame members comprise a plurality of parallel rods, as discussed above. For example, each of the arm sections may define a groove having essentially the shape of a half-circle, so that one end of the first arm sections defines a pair of nippers for clamping the wheel structure to the frame. It will be appreciated that first arm sections may alternatively be provided with a protrusion for engaging a corresponding groove of the frame. That portion of each first arm section, which engages the frame, is preferably arranged on a side of the element which is opposite to that side of the arm section to which the second arm section is attached. Thus, it may conveniently be achieved that one end of the first arm sections engage the frame, when the first arm sections are unfolded away from the central plane.

There may be provided locking means for locking the unfolded wheel structure to the frame. For example, there may be provided a spring member at the centre element for spring-biasing the first arm sections toward the central plane.

The first and second sections of each arm may be pivotally interconnected, so that the two sections of each arm extend away from the central plane in the unfolded configuration. The second section of each arm may thereby define a hinged end, at which the second arm section is hinged to the first arm section. At an opposite end of the second arm section there may be provided means for supporting one of the wheels.

Each of the first and second arm sections may be arc-shaped to define respective convex and concave side surfaces. Thus, in the folded configuration of each arm, the convex side surface of the second arm section essentially co-extends with the convex side surface of the first arm section, so that the two arm sections of each the two arms define a single curved shape, for example a U-shape. In this, folded configuration the arm sections of the two respective arms may be moved towards each other by mutually pivoting or sliding the first arm sections around/in the centre element, to further limit the spatial extent of the wheel structure. In the unfolded configuration, however, the convex side surface of the second arm section extends in continuation of the concave side surface of the first arm section to form an S-shape, whereby the wheel structure has the spatial extent necessary to provide a stable support for the golf trolley.

The arc-shaped arm sections preferably have a maximum outer diameter in the folded configuration which is approximately equal to the outer diameter of the wheels and/or approximately equal to the inner diameter of the casing, so that the wheel suspension structure, including the arms may be accommodated in the casing.

In order to minimize weight and spatial extent of the wheel structure in the folded configuration, one of the arm sections of each arm may be defined by two mutually spaced arm members, between which at least a portion of the other arm section is received in the folded configuration. For example, the first arm sections may be constituted by two such mutually spaced arm members.

The means for supporting the wheels preferably comprises a rod which is pivotally mounted to the second arm section at that end thereof, which is a free end in the unfolded configuration, i.e. at the end opposite to the hinge which interconnects the first and second arm portions. There may be provided bearings in the wheels for providing improved rolling capabilities of the wheels. In order to secure the wheels in relation to their respective rods, the may be provided a locking mechanism, such as a clamping mechanism, for locking the parts together. For example, each of the rods may comprise an enlarged or reduced diameter portion for engaging or abutting a corresponding groove, flange or protrusion of the wheel hub, the enlarged diameter portion or the wheel hub material being sufficiently elastic to provide the clamping function for releasably attaching the wheel to the rod.

In one embodiment, the rod is pivotally mounted in such a manner that that one of the wheels, which is supported by the rod, is pivotal between a non-operating position, in which an axis of rotation of the wheel is transverse to the second arm section, and an operating position, in which the axis of rotation of the wheel forms an extension of the second arm section. Thus, the wheel need not be dismounted from the rod when the wheel supporting structure is to be collapsed. Preferably, both of the wheels are pivotable such with respect to the respective second arm sections that, in the non-operating position, the wheels and the wheel supporting structure form a sandwich configuration in which wheel supporting structure is sandwiched between the two wheels. This may conveniently be achieved when both wheels are pivotable in the same direction, i.e. clockwise or counter clockwise. In the non-operating position, the wheels may be spring-biased or otherwise forced to be kept in place. Also in the operating position, means may be provided for spring-biasing or otherwise forcing the wheels to stay in place.

In a second aspect, the invention provides a collapsible wheel structure for a mobile appliance, comprising:
  at least two wheels;
  a wheel supporting structure having two supporting arms extending from and being interconnected at a centre element, whereby, in an unfolded configuration of the wheel structure, the supporting arms interconnect the wheels, the wheel structure being symmetrical around a central plane in the unfolded configuration;
  each arm comprising a first section which, in the unfolded configuration, is proximal with respect to the central plane, and a second section which, in the unfolded configuration, is distal with respect to said central plane, said centre hinge thereby interconnecting the respective first sections of the two arms;
  the first and second sections of each arm being pivotally interconnected, so that the two sections of each arm extend away from the central plane in the unfolded configuration, the second section of each arm thereby defining a hinged end, at which the second arm section is hinged to the first arm section, and an opposite end, at which there is provided means for supporting one of the wheels;

whereby, in the folded configuration, the opposite end of each of the second arm sections is closer to the centre hinge than the hinged end of the second arm section.

The centre element may define a hinge and/or an arrangement for slidable movement of the wheels, so that wheels, in one configuration for storage and transportation, may overlap each other, i.e. with common axes of rotation. In another configuration of use, the wheels may be at a mutual distance, the wheels with their respective arms being moved apart in their sliding support in the centre element. For example, the arms may be unfolded in this configuration, and subsequently the wheels may be pivoted by 90°, i.e. out of their plane of storage to their plane of use.

It will be appreciated that all features disclosed and discussed above in connection with the wheel structure of the golf trolley according to the first aspect of the invention may also be present in the wheel structure according to the second aspect of the invention. Accordingly, each of the first and second arm sections may be arc-shaped to define respective convex and concave side surfaces. In the folded configuration of each arm, the convex side surface of the second arm section may essentially co-extend with the convex side surface of the first arm section, and in the unfolded configuration of each arm, the convex side surface of the second arm section may extend in continuation of the concave side surface of the first arm section. The arc-shaped arm sections may have a maximum outer diameter in the folded configuration which is approximately equal to the outer diameter of the wheels. One of the arm sections of each arm may be defined by two mutually spaced arm members, between which at least a portion of the other arm section may be received in the folded configuration. The means for supporting the wheels may comprise a rod which is pivotally mounted to the second arm section.

It will be appreciated that the present invention also provides a mobile appliance comprising a collapsible wheel structure according to the second aspect of the invention. Such a mobile appliance may, for example, comprise a golf trolley, a manually pulled truck, a luggage or shopping trolley or cart, a wheeled bed, a wheelchair, a mobile device for partially or complete lifting and/or transporting disabled persons, etc.

BRIEF DESCRIPTION OF THE DRAWINGS

Embodiments of the two aspects of the invention will now be further described with reference to the accompanying drawings, in which.

DETAILED DESCRIPTION OF THE DRAWINGS

Figure 1:
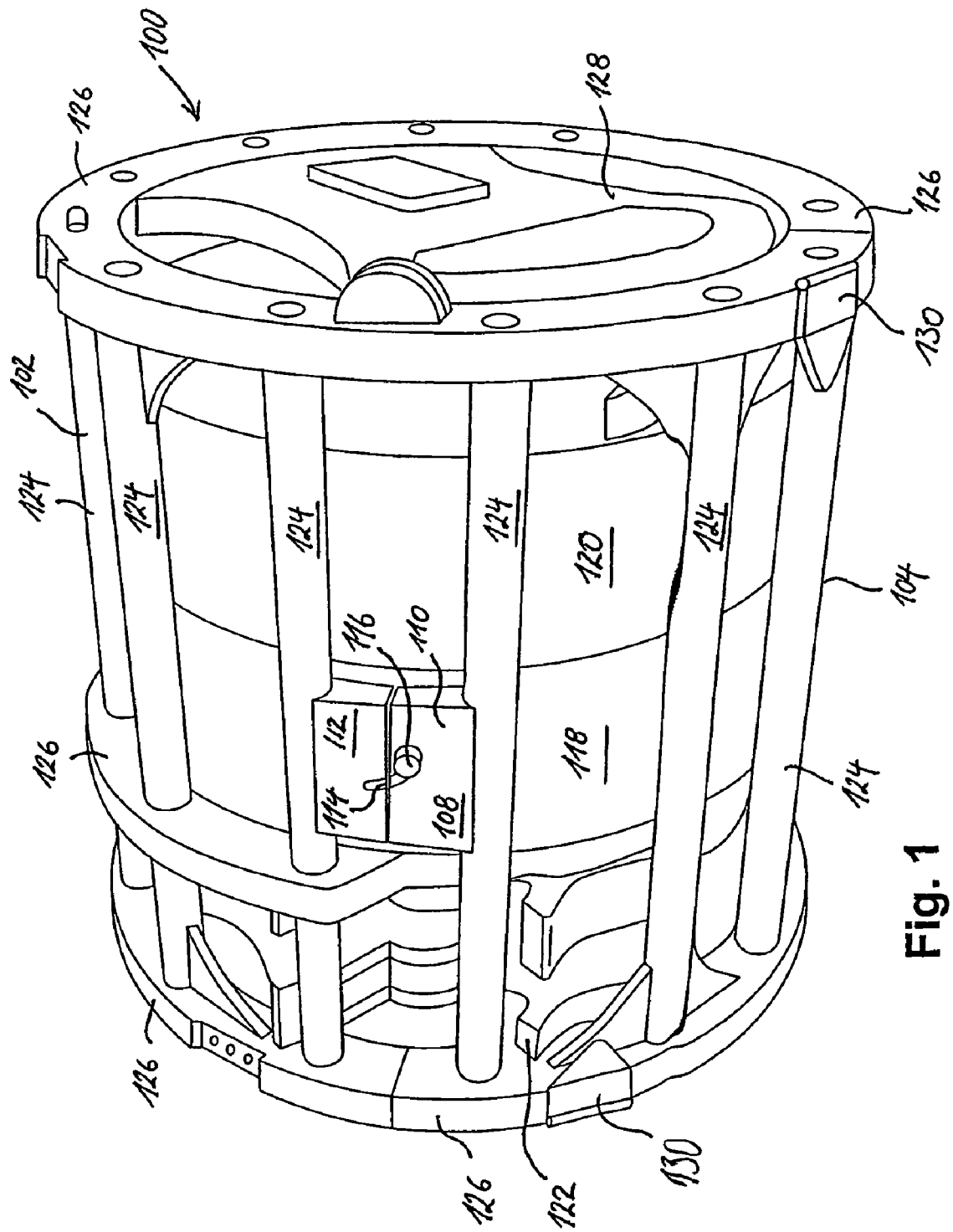
FIG. 1 shows a collapsed configuration of a golf trolley according to the invention.
Figure 6:
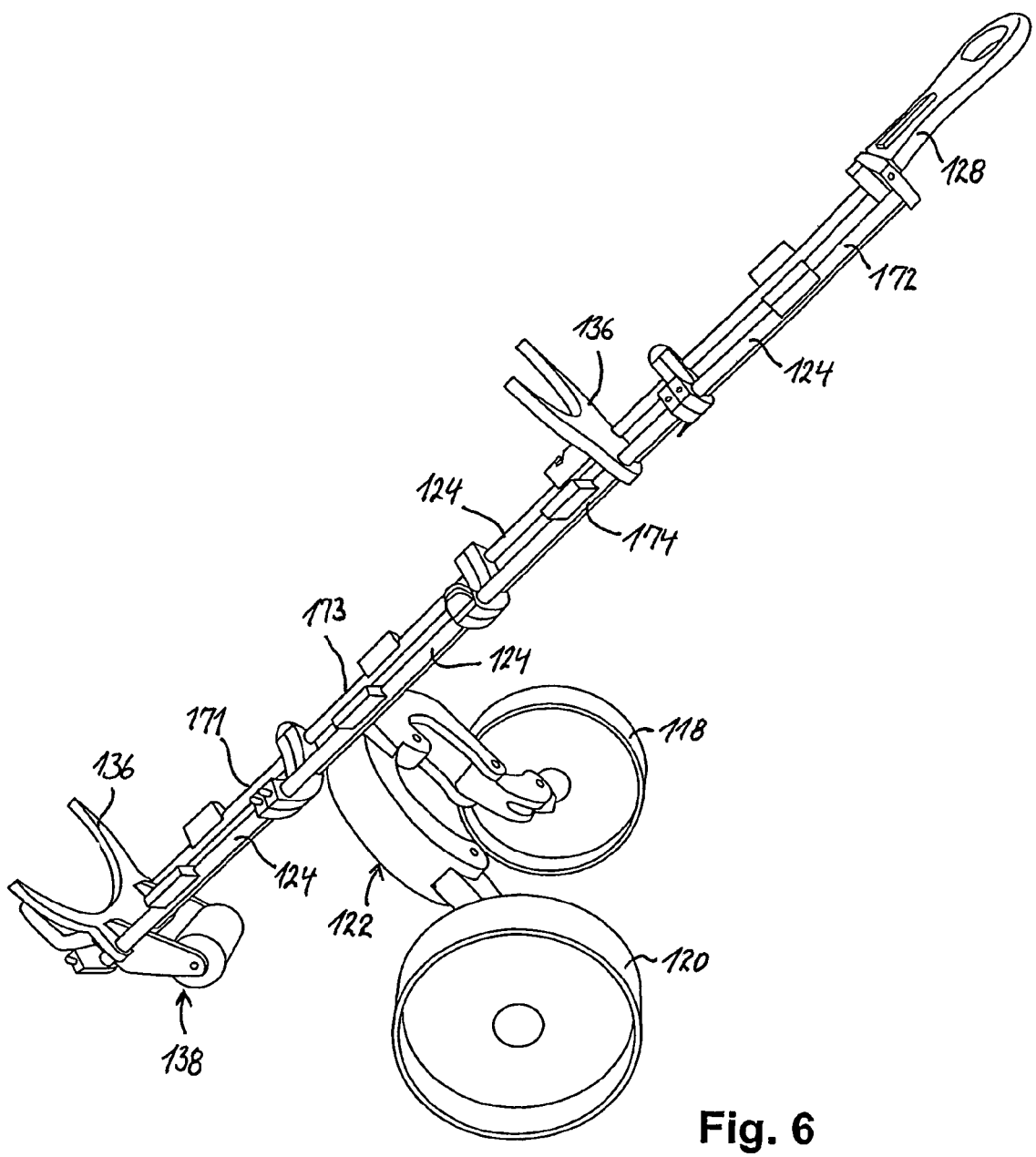

FIG. 1 shows a first, collapsed configuration of the golf trolley according to the invention. The second, unfolded configuration of the golf trolley is depicted in FIG. 6. Turning to FIG. 1, there is shown a casing 100 comprising an upper casing part 102 and a lower casing part 104. The upper and lower parts 102,104 are pivotally interconnected at first hinges 106 (see FIGS. 2 and 3) and mutually locked by locking mechanism 108, comprising two members 110,112 defining a groove 114, in which there is arranged a sliding pin 116, the sliding pin being movable between the position shown in FIG. 1, in which it engages the lower member 110 and provides an interlocking of the upper and lower casing parts 102,104, and a position, in which it does not engage the lower member 110, and in which the casing parts are not interlocked. The casing 100 accommodates various wheel structure parts, including two wheels 118,120 and a collapsible wheel supporting structure 122, which is folded or collapsed in FIG. 1. The wheels and wheel supporting structure, which in the embodiment shown is a collapsible wheel structure according to the second aspect of the invention, will be discussed in greater detail below.

As indicated in FIG. 1, the casing parts 102 and 104 comprise a plurality of rods 124 which are interconnected by arc-shaped supporting members 126 extending transversely to the rods. Some of the arc-shaped supporting members define end surfaces of the casing. In FIG. 1, the right-hand end surface is further defined by a handle 128 which is pivotal between the position shown in FIG. 1 and the position shown in FIGS. 2-6. One or more pivotable plates 130 are optionally provided for further mutual fixation of the casing parts.

Figure 2:
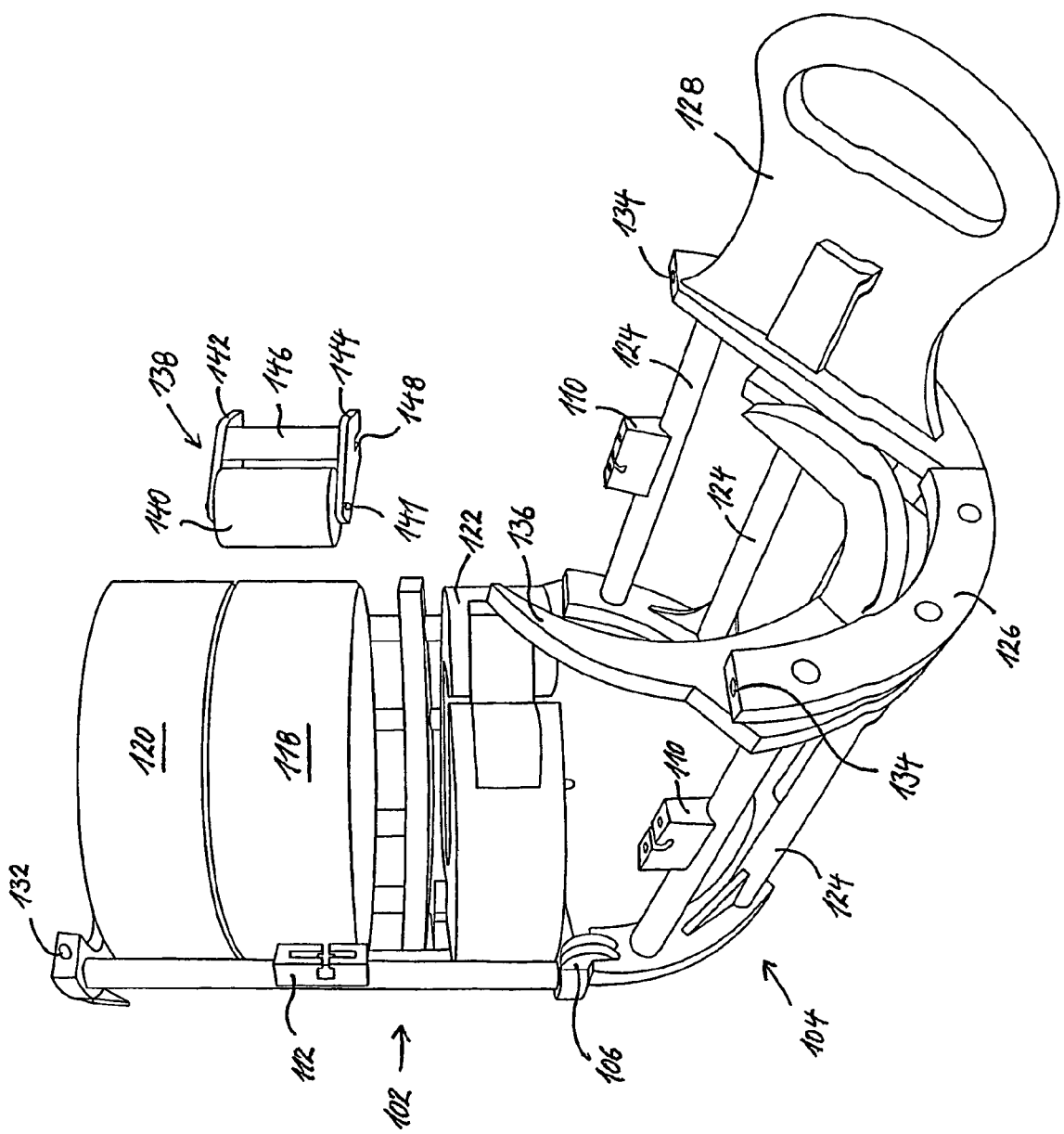
FIGS. 2-6 are successive illustrations showing the evolution of a first embodiment of the golf trolley of FIG. 1 from the collapsed configuration of FIG. 1 to a second, unfolded configuration of FIG. 6.

As shown in FIG. 2, a first step of unfolding the golf trolley comprises pivoting the upper casing part 102 around hinge 106 to lay open the interior of the casing and those parts accommodated therein. Steering pins 132 and corresponding steering holes 134 are provided in the supporting members 126 for achieving precise positioning of the upper and lower casing parts 102,104 when collapsing or folding the golf trolley. A golf-bag supporting member 136, which will be discussed further below, is also accommodated in the casing, along with a supporting wheel 138, comprising a roller 140 rotatably mounted on a shaft 141, opposed ends of which are supported by respective mounting members 142,144. A support 146 interconnects the two mounting members 142,144. In each of the mounting members 142,144 there is provided a groove 148 for attaching the structure of the supporting wheel 138 to one of the supporting members 126 of the frame, as shown in FIG. 6.

Figure 3:
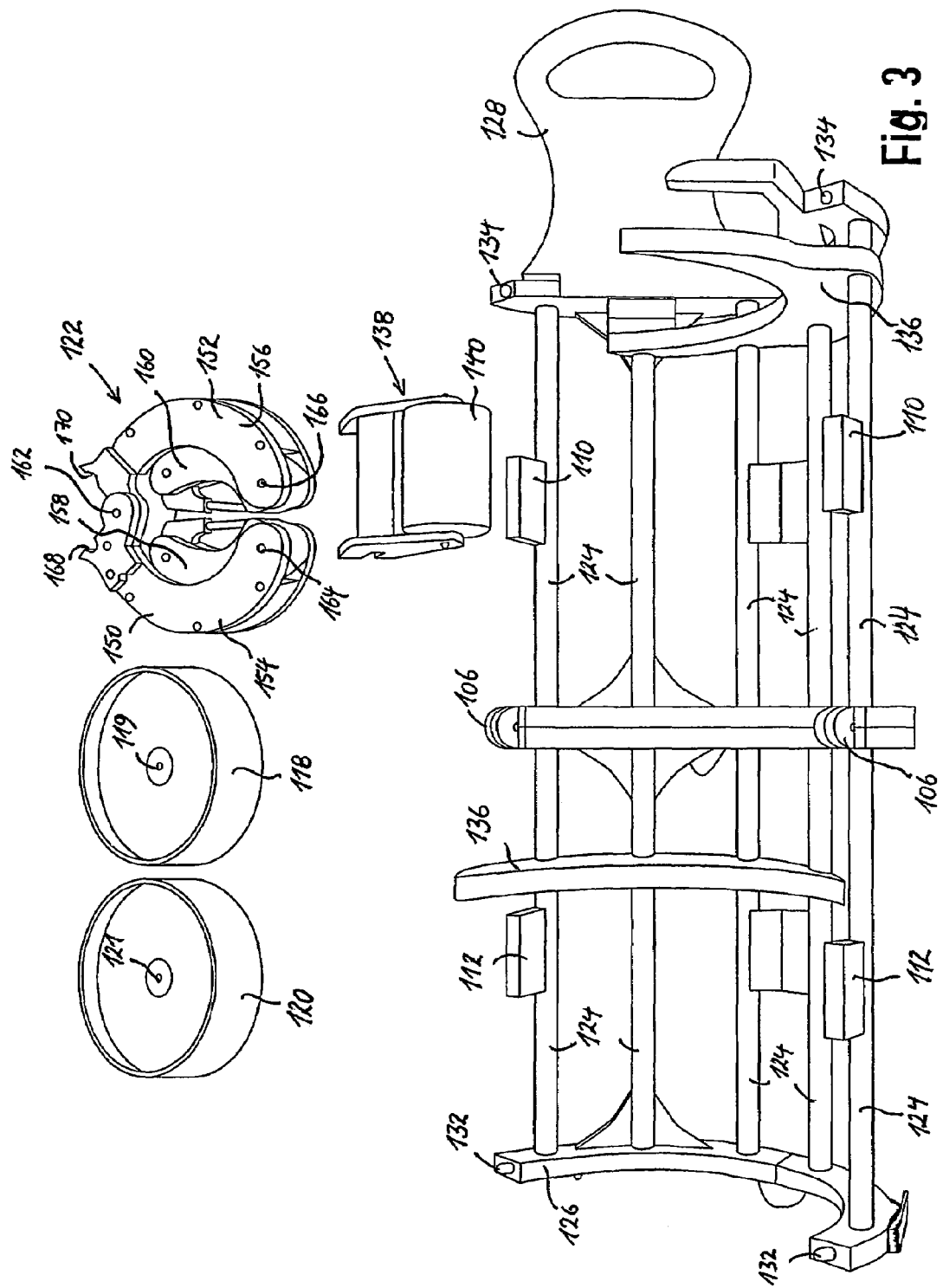

In FIG. 3, the upper casing part has been completely unfolded, and the wheels 118,120 as well as the wheel supporting structure 122 and the supporting wheel 138 have been removed. As shown in the upper part of FIG. 3 (the upper part of FIG. 3 being identical to the enlarged view of FIG. 7), the wheel structure 122 comprises two arms 150,152, which define first arm sections 154,156 and second arm sections 158,160. The first arm sections 154,156 are pivotally interconnected at centre hinge 162 arranged in a central symmetry plane of the wheel structure 122. Each of the first arm sections 154,156 is pivotally connected to a respective second arm section 158,160 around arm hinges 164,166. In the first arm sections 154,156 there are provided half-circle shaped grooves 168,170 for clamping the wheel structure to one of the rods 124 of the frame of the golf trolley, so as to secure the wheel structure to the frame, see FIG. 6. Wheel hubs 119,121 are provided in the wheels for mounting thereof, cf. the more detailed description of the wheel structure set forth below in connection with FIGS. 7-11.

Figure 4:
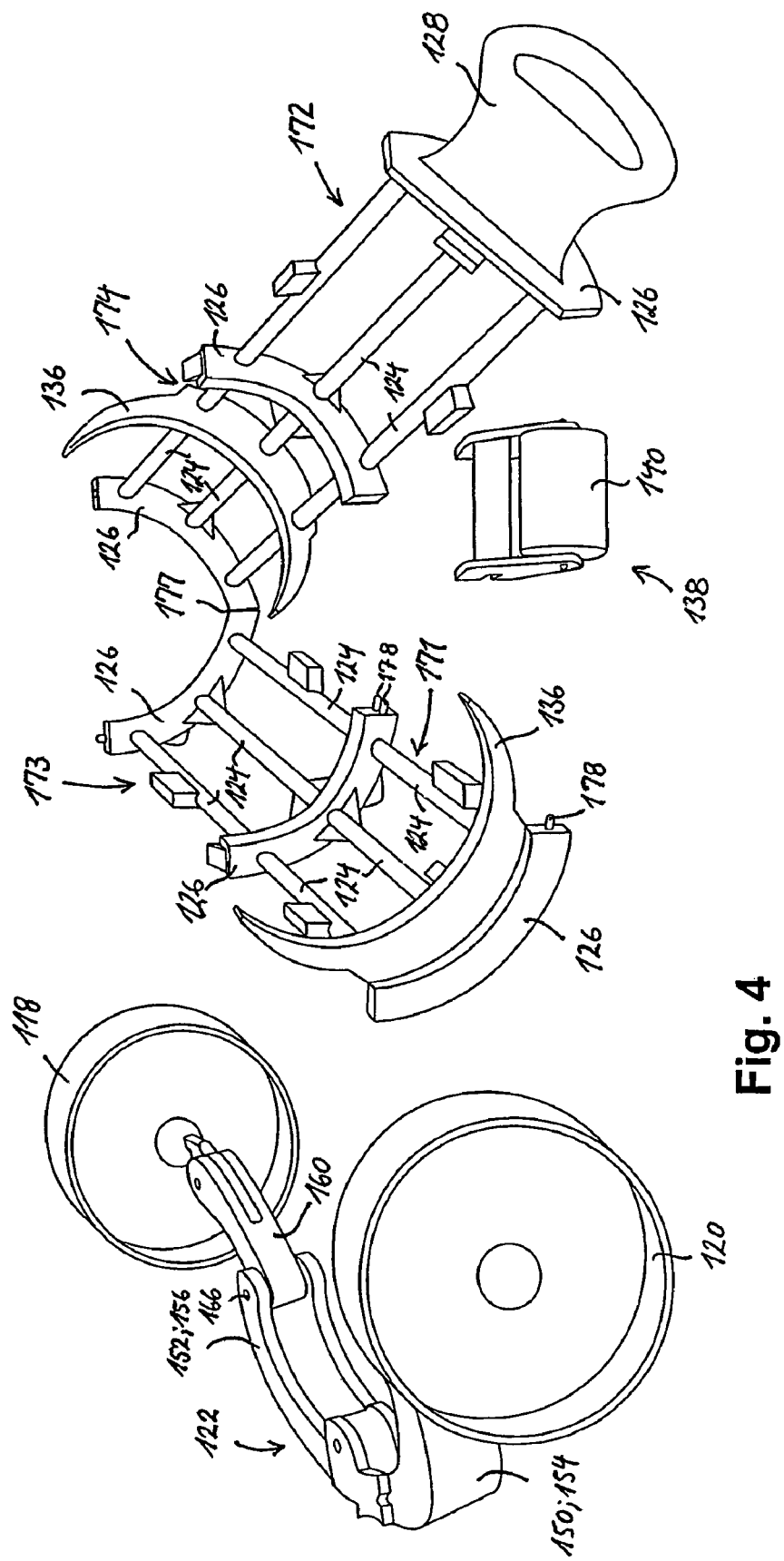
Figure 5:
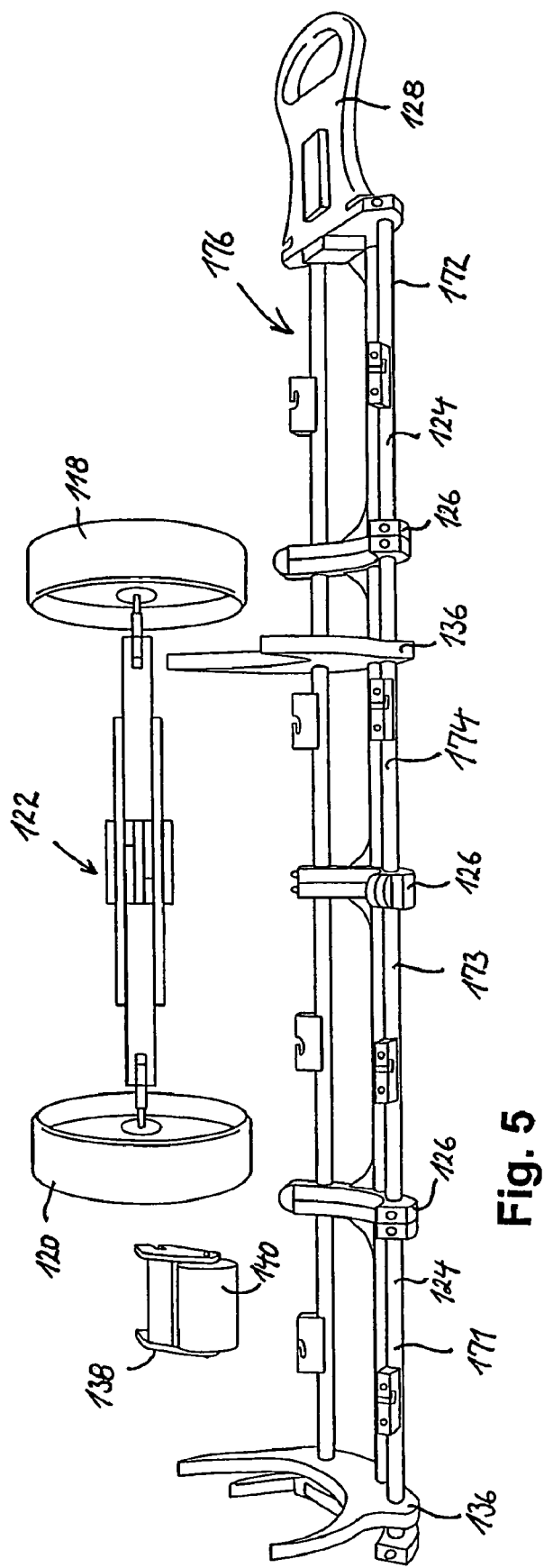

The left-hand section of FIG. 4 illustrates the wheel structure 122 in its unfolded, assembled state. As shown in the right-hand section of FIG. 4, the intermediate configuration of FIG. 3 may be unfolded further by pivoting a left part of the frame around a second hinge 177 to arrive at the fully unfolded configuration of the frame 176 (see FIGS. 5 and 6). It will thus be appreciated that the frame of the golf trolley comprises first, second, third and fourth frame members 171, 172,173,174. The fully unfolded, extended frame 176 is depicted in the lower portion of FIG. 5. There may be provided locking means (not shown) for interlocking respective neighbouring frame members in the unfolded, extended configuration of the frame 176 shown in FIG. 5. As shown in FIG. 4, steering pins 178 and corresponding steering holes (not shown) are provided for precise positioning of the first and third frame members 171,173 with respect to the second and fourth frame members 172,174.

The fully unfolded golf trolley is depicted in FIG. 6, in which the wheel structure is attached to the third frame member 173 by the grooves 168,170 (see the upper right section of FIG. 3) engaging and clamping around one of the rods 124. The supporting wheel 138 is attached to a far low end portion of the frame by the grooves 148 (see FIG. 2) engaging a supporting member 126.

The two golf-bag supporting members 136 may be releasably attached to the frame members, for example to rods 124 of the first and fourth frame members 171,174 as shown in FIG. 6, or they may be non-releasably fixed thereto. They are arranged at a mutual distance for providing a stable lateral support for a golf bag to be positioned on the golf trolley.

Figure 7:
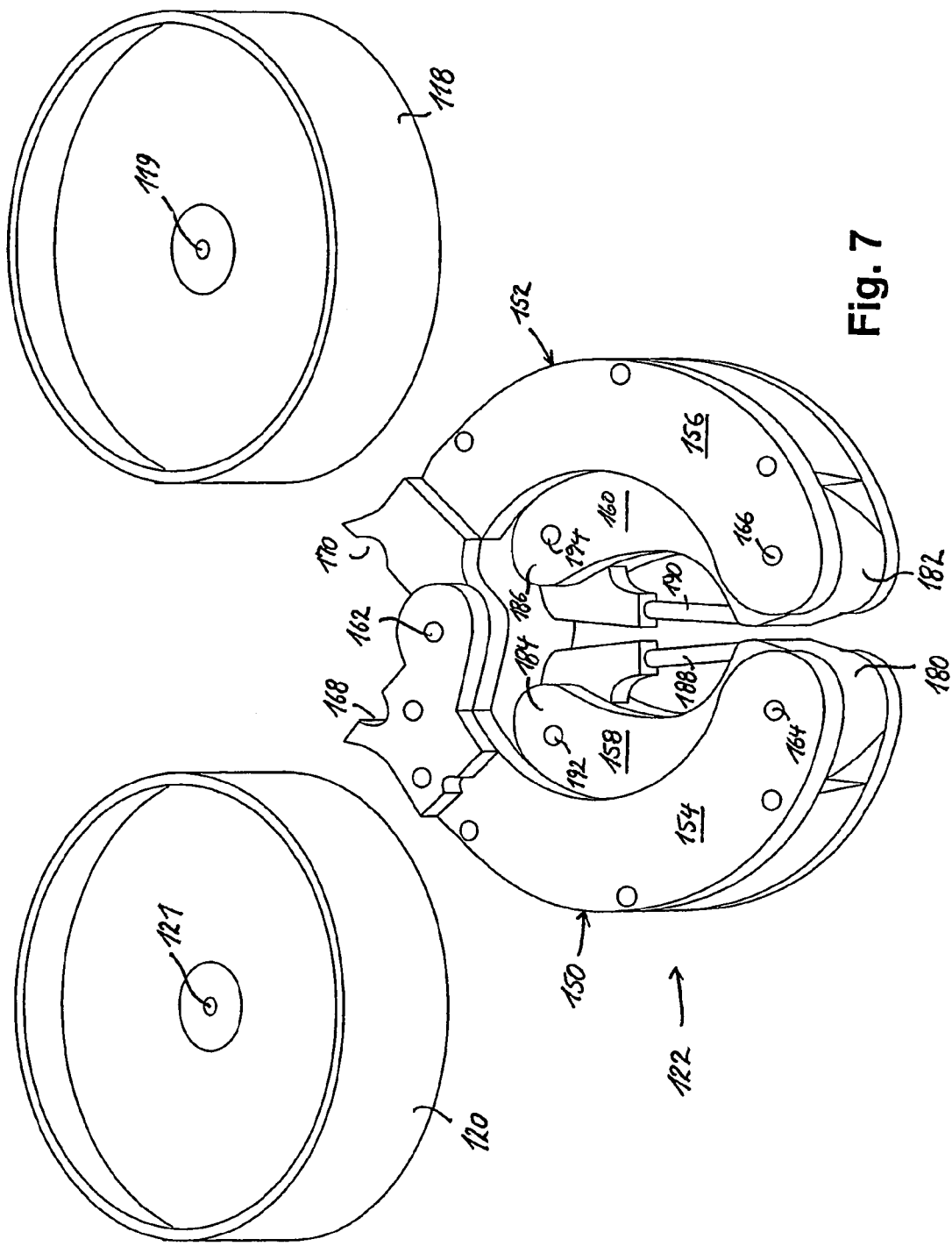
FIGS. 7-11 are detailed illustrations of a first embodiment of a collapsible wheel structure according to the invention, which may be employed in the golf trolley of FIGS. 1-6.
Figure 8:
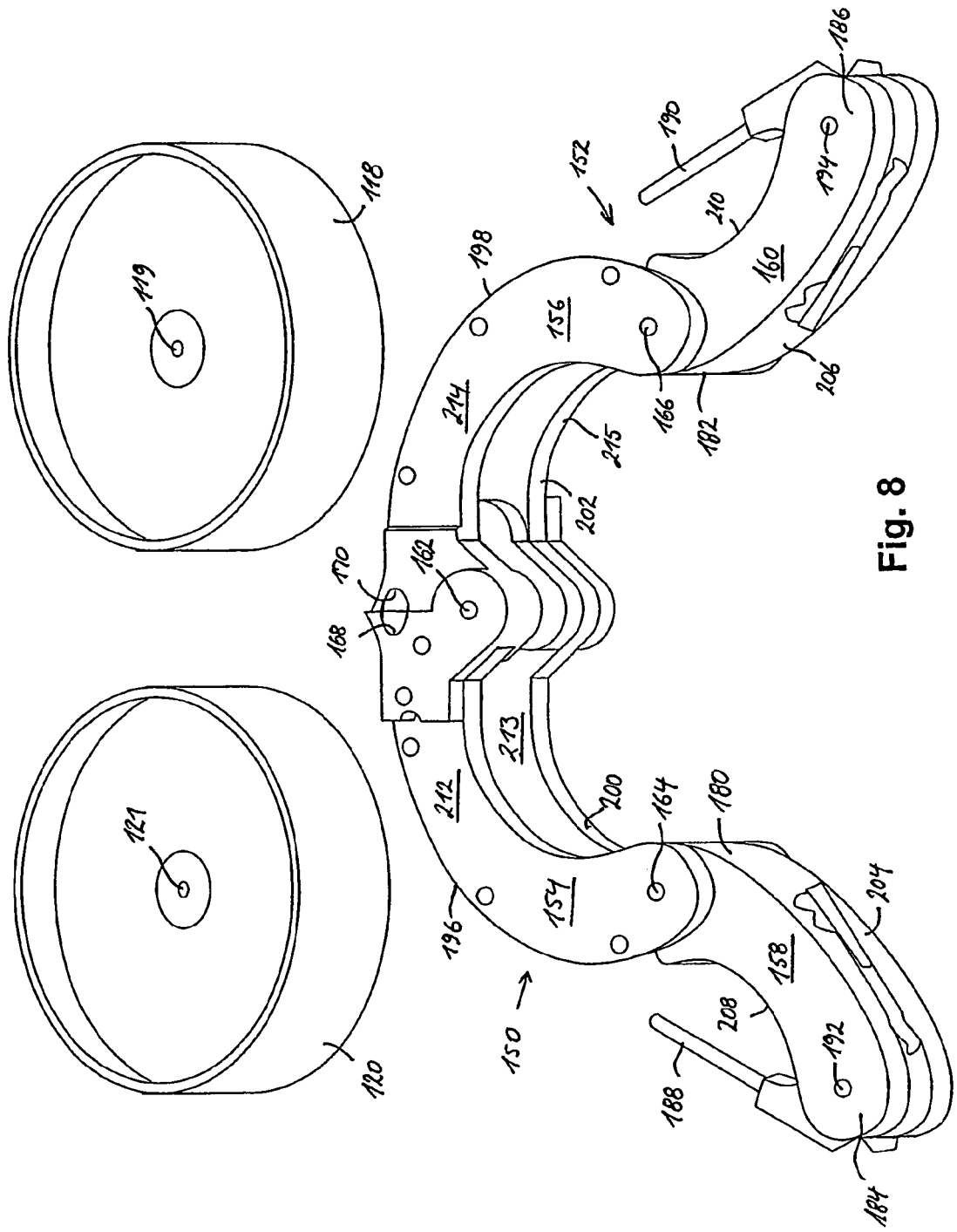
Figure 9:
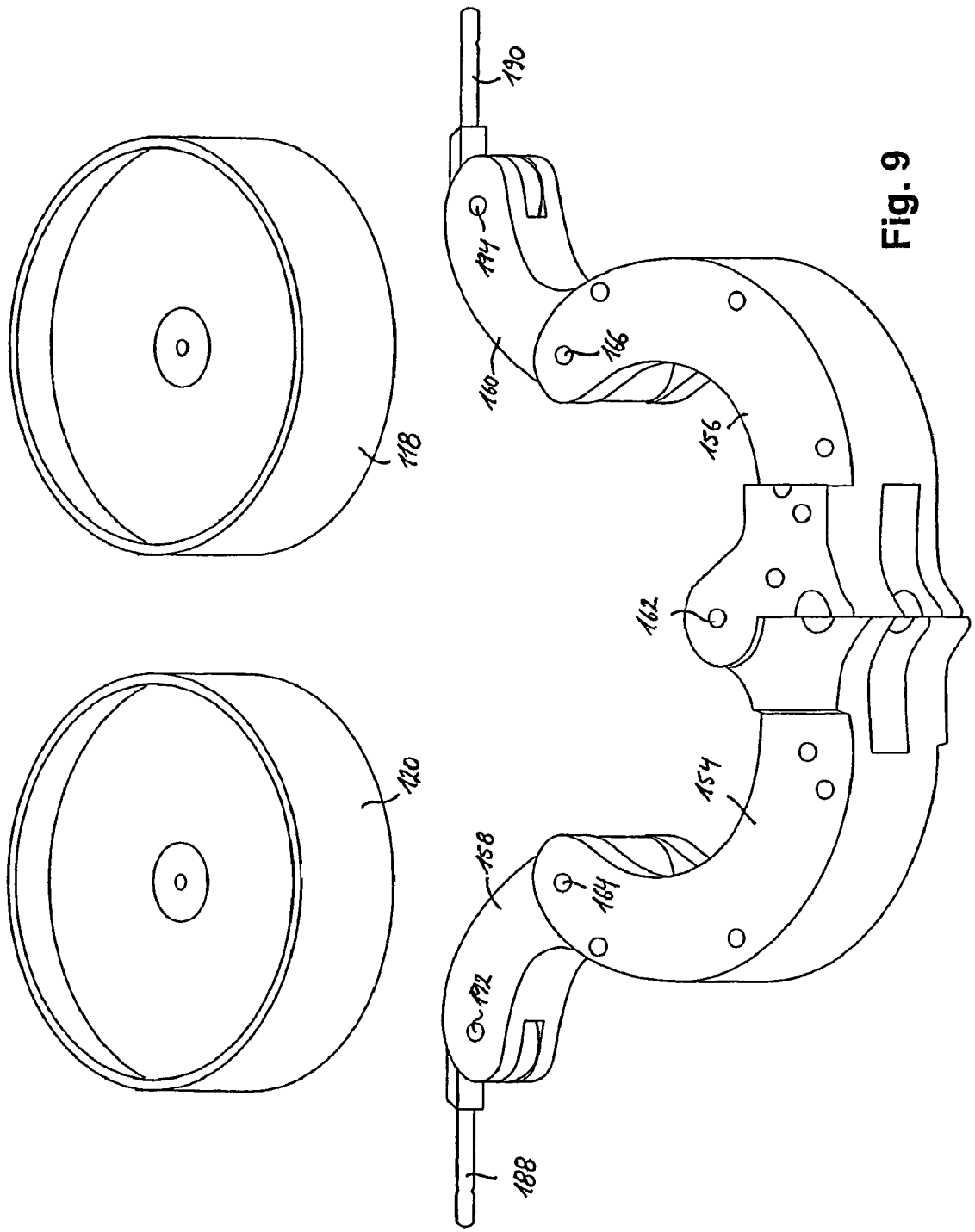
Figure 10:
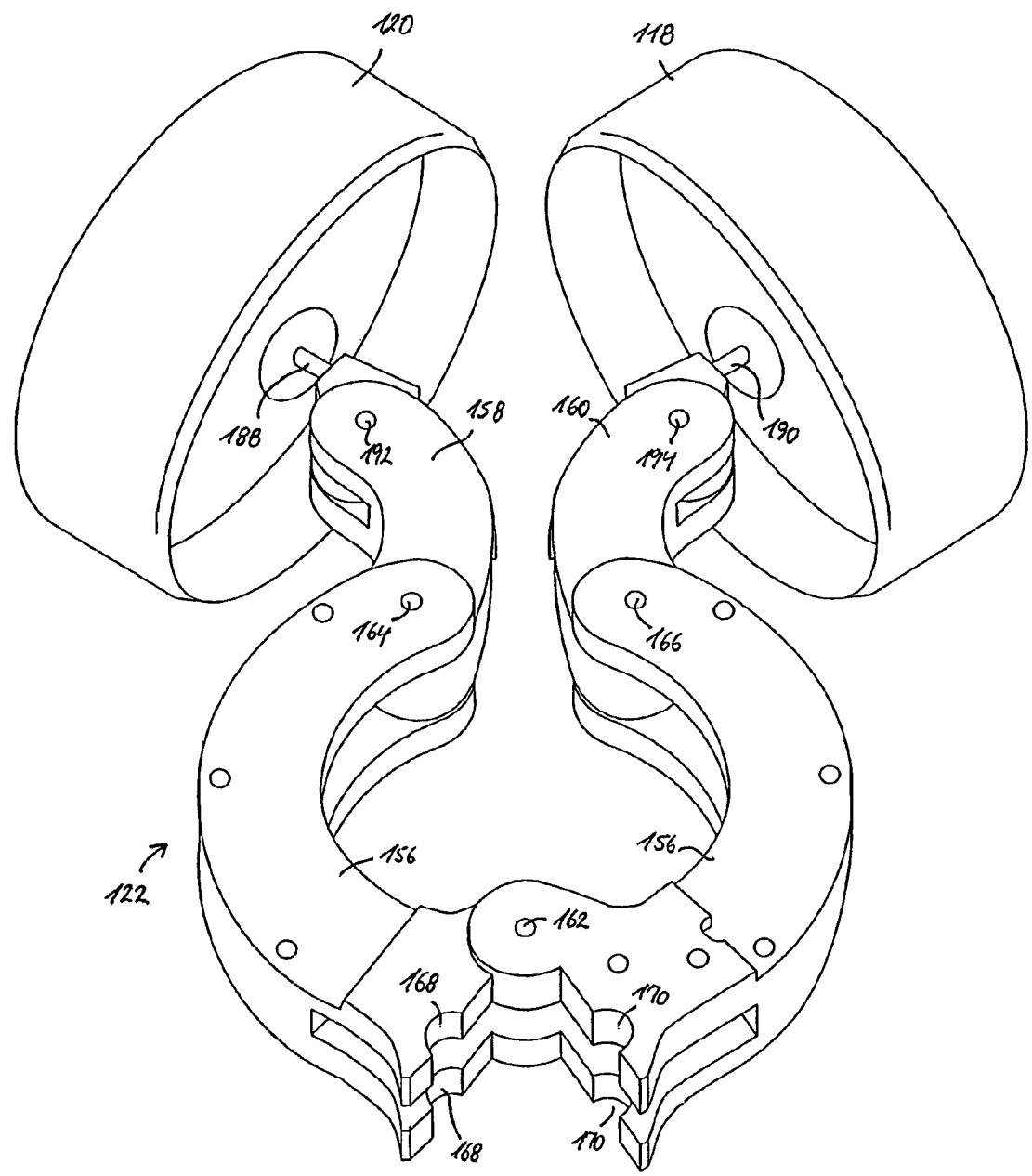
Figure 11:
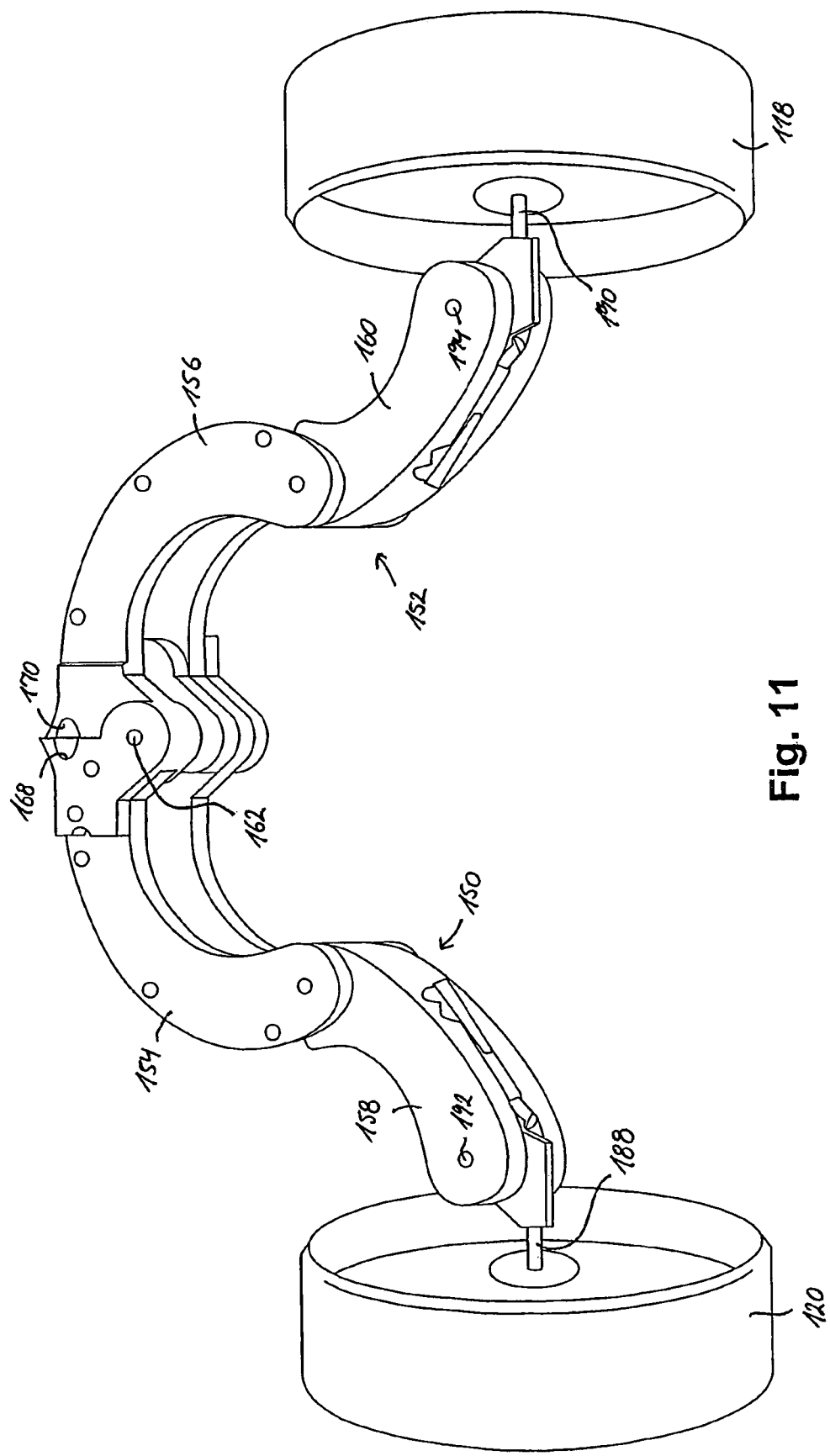

The wheel structure 122, which is a collapsible wheel structure of the second aspect of the invention, and which has been generally described in connection with FIG. 3, will now be described further with reference to FIGS. 7-11. As shown in FIGS. 7 and 8, each of the second arm sections 158,160 comprises a hinged end 180,182, at which the second arm sections 158,160 are hinged to the first arm sections 154,156. At opposite ends 184,186 of the second arm sections 158,160 there is provided means for supporting the wheels 118,120, such means comprising pivotally mounted rods 188,190 hinged at hinges 192,194. When the wheel structure is to be unfolded, the first arm sections 154,156 are first pivoted outwardly around centre hinge 162, and then the second arm sections 158,160 are moved away from the centre hinge 162 by pivoting thereof around the arm hinges 164,166. Next, the rods 188,190 are pivoted outwardly to the position shown in FIG. 9, and the wheels 118,120 are mounted to the rods 188,190 as shown in FIG. 10. In the final position illustrated in FIG. 11, the grooves 168,170 define an essentially circle shaped enclosure for attaching the wheel structure to a mobile appliance, such as to the golf trolley of the first aspect of the invention, as described above in connection with FIGS. 1-6.

In an alternative embodiment of the wheel structure (not shown), the rods 188,190 are pivotally mounted in such a manner that the wheels are pivotal between a non-operating position, in which the wheels' axes of rotation are transverse to the second arm sections 158,160, and an operating position, in which the axes of rotation of the wheels form an extension of the second arm sections. Thus, the wheels need not be dismounted from the rods in order to collapse the wheel supporting structure and the associated wheels.

As it is apparent from FIGS. 7 and 10, that end of the second arm sections 158,160 which is opposite to the hinged end 180,182 is closer to the centre hinge in the folded configuration (FIG. 7) than in the unfolded configuration (FIG. 10). It is thereby achieved that the wheel structure is as compact in the folded configuration as shown in FIG. 7.

Each of the first and second arm sections are arc-shaped. Thereby, the first arm sections 154,156 define convex side surfaces 196,198 and concave side surfaces 197,199, cf. FIG. 8. Likewise, the second arm sections 158,160 define convex side surfaces 196',198' and concave side surfaces 197',199'. In the unfolded configuration shown in FIG. 8, the convex side surfaces 196',198' of the second arm sections 158,160 extend in continuation of the concave side surfaces 197,199 of the first arm sections 154,158, so that the arms 150,152 essentially define the form of an S in the unfolded configuration.

As shown in FIG. 8, the first arm sections 154,156 are defined by two mutually spaced arm members 154',154" and 156',156", between which a portion of each of the second arm sections 158,160 is received in the folded configuration shown in FIG. 7.

Figure 12:
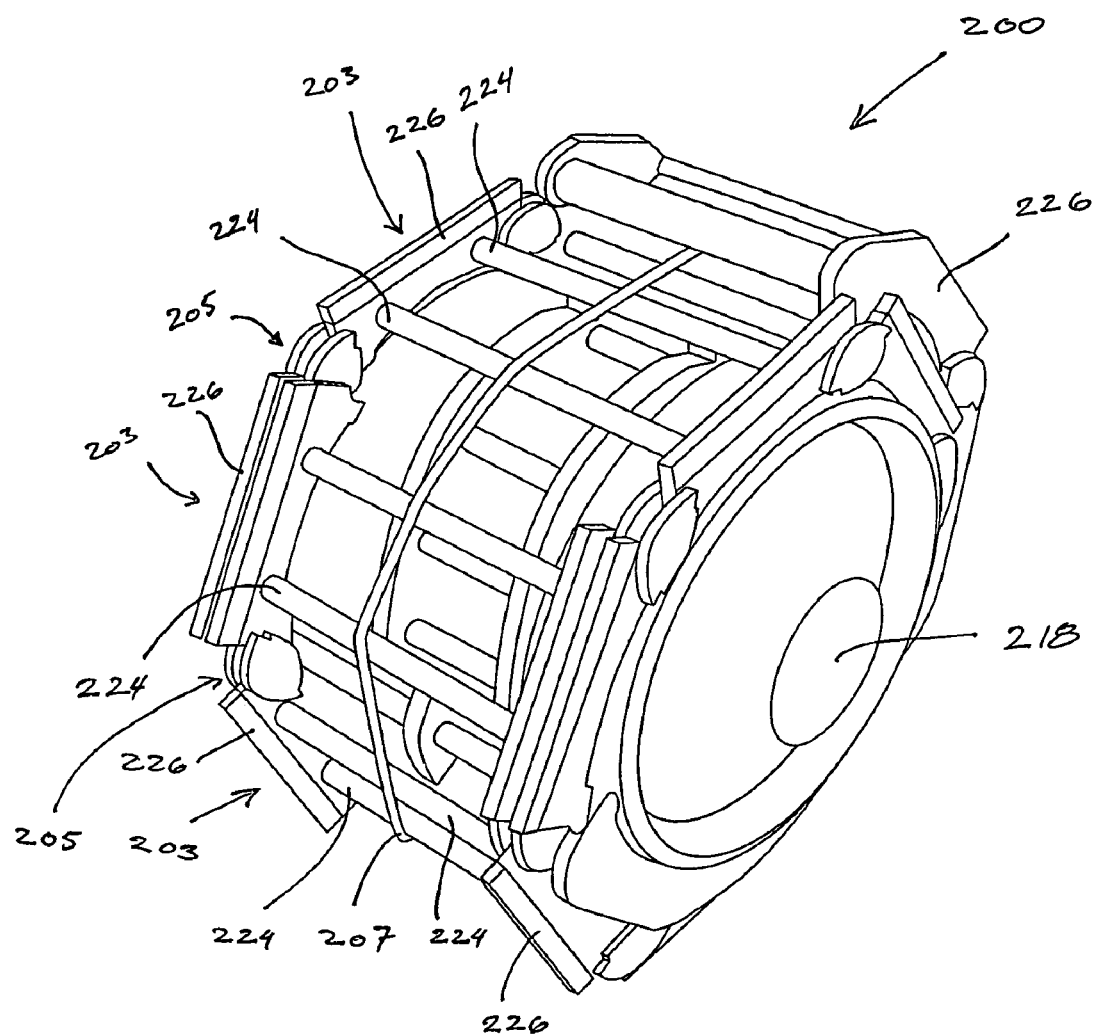
FIGS. 12-21 illustrate a second embodiment of the golf trolley and the collapsible wheel structure.
Figure 21:
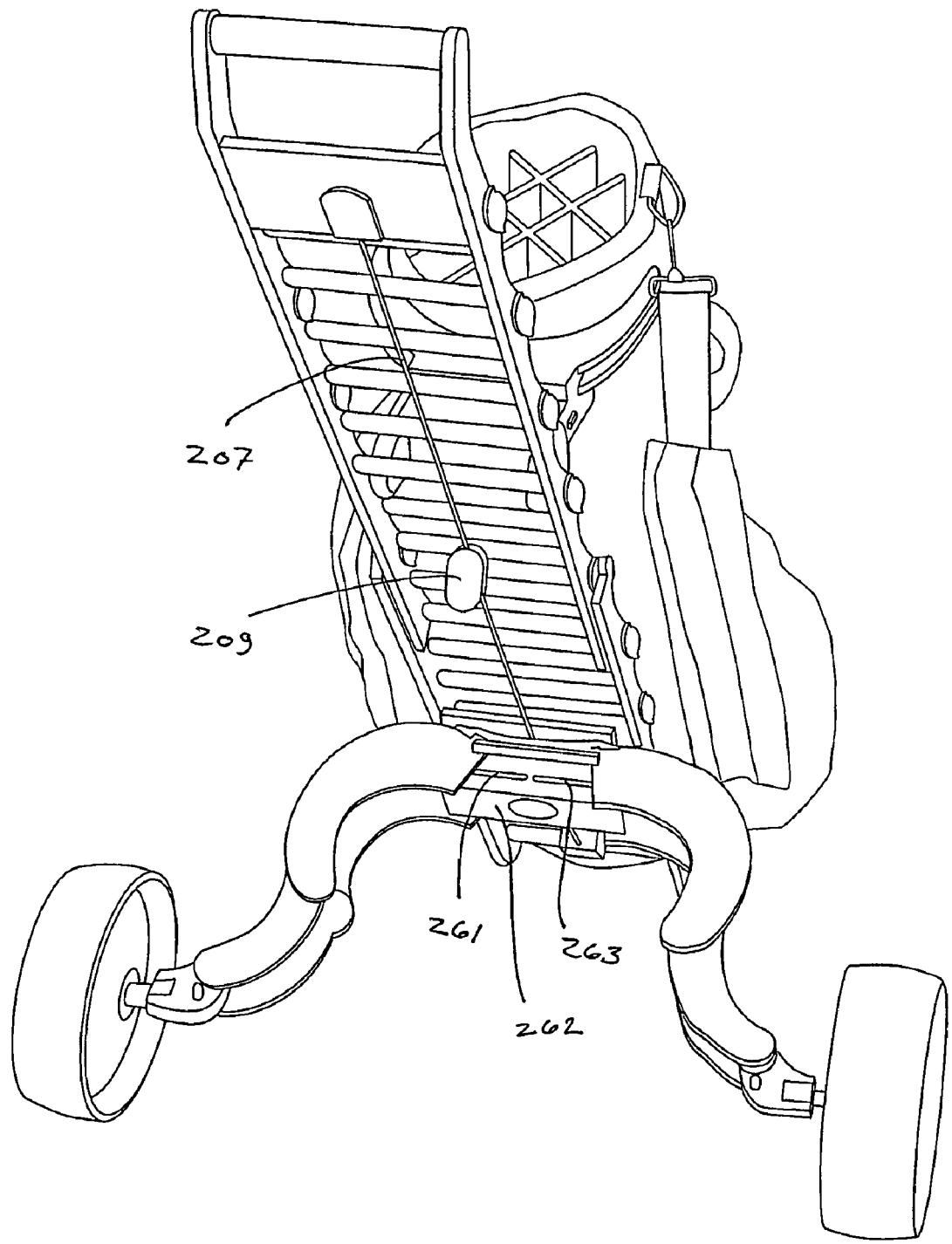

FIG. 12 shows a first, collapsed configuration of the golf trolley according to the second embodiment of the invention. The second, unfolded configuration of the golf trolley is depicted in FIG. 21. Turning to FIG. 12, there is shown a casing 200 comprising a plurality of frame members 203. Each frame member 203 comprises two rods 224 interconnecting two arc-shaped or liniar supporting members 226. The rods 224 extend transversely to the arc-shaped supporting members 226. The frame members 203 are pivotally interconnected by hinges 205 provided at the end portions of the arc-shaped supporting members 226. The casing 200 accommodates various wheel structure parts, including two wheels 218,220, see also FIG. 16, and a collapsible wheel supporting structure 222, which is folded or collapsed in FIG. 12. The wheels and wheel supporting structure, which in the embodiment shown is a collapsible wheel structure according to the second aspect of the invention, will be discussed in greater detail below.

Figure 13:
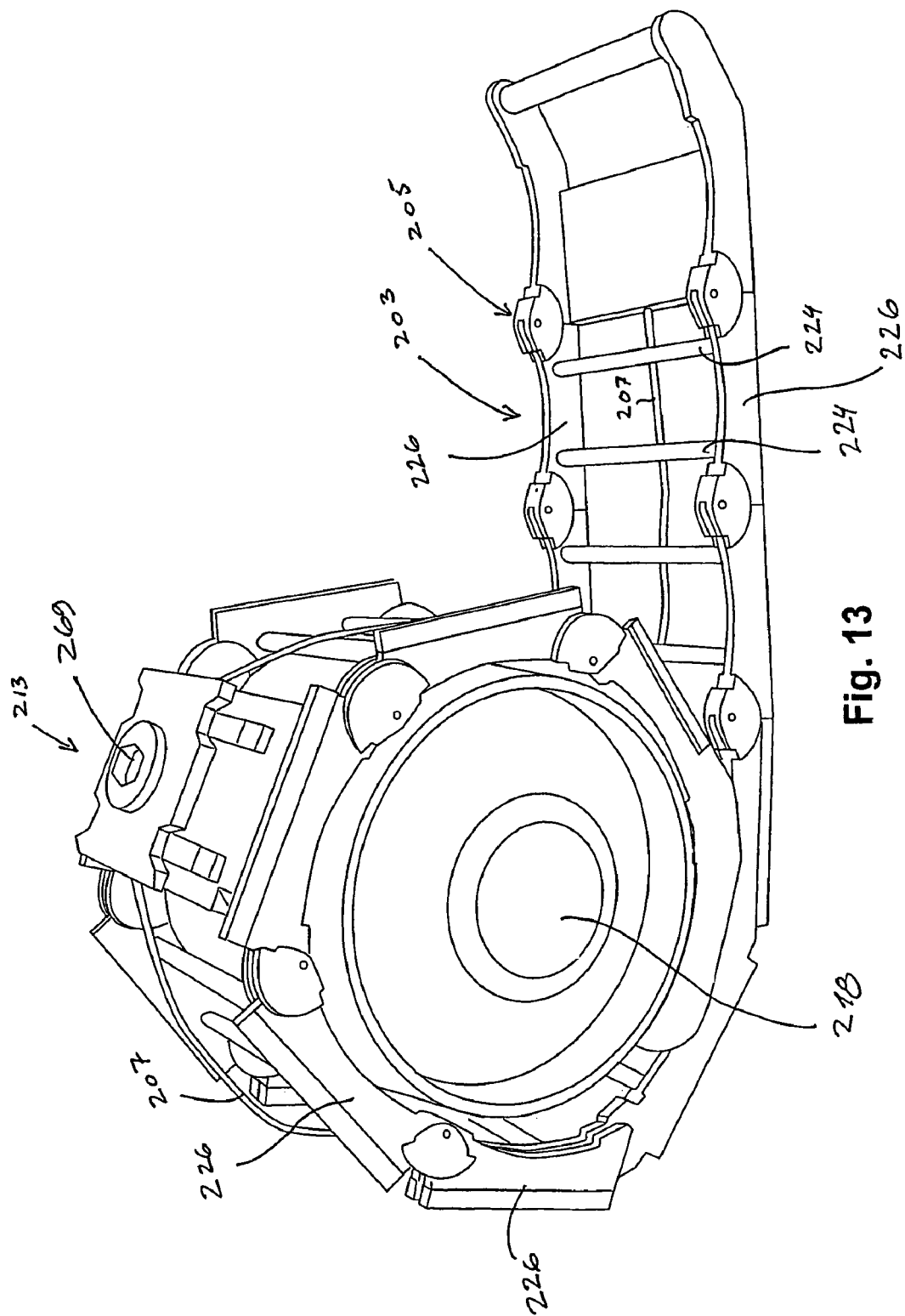
Figure 14:
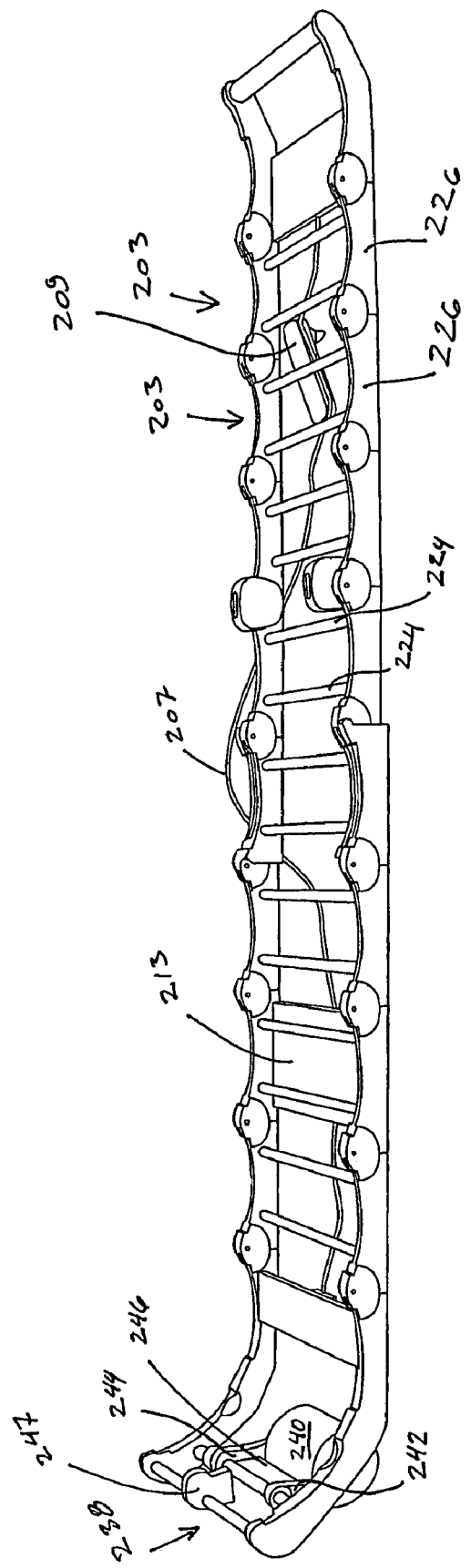
Figure 15:
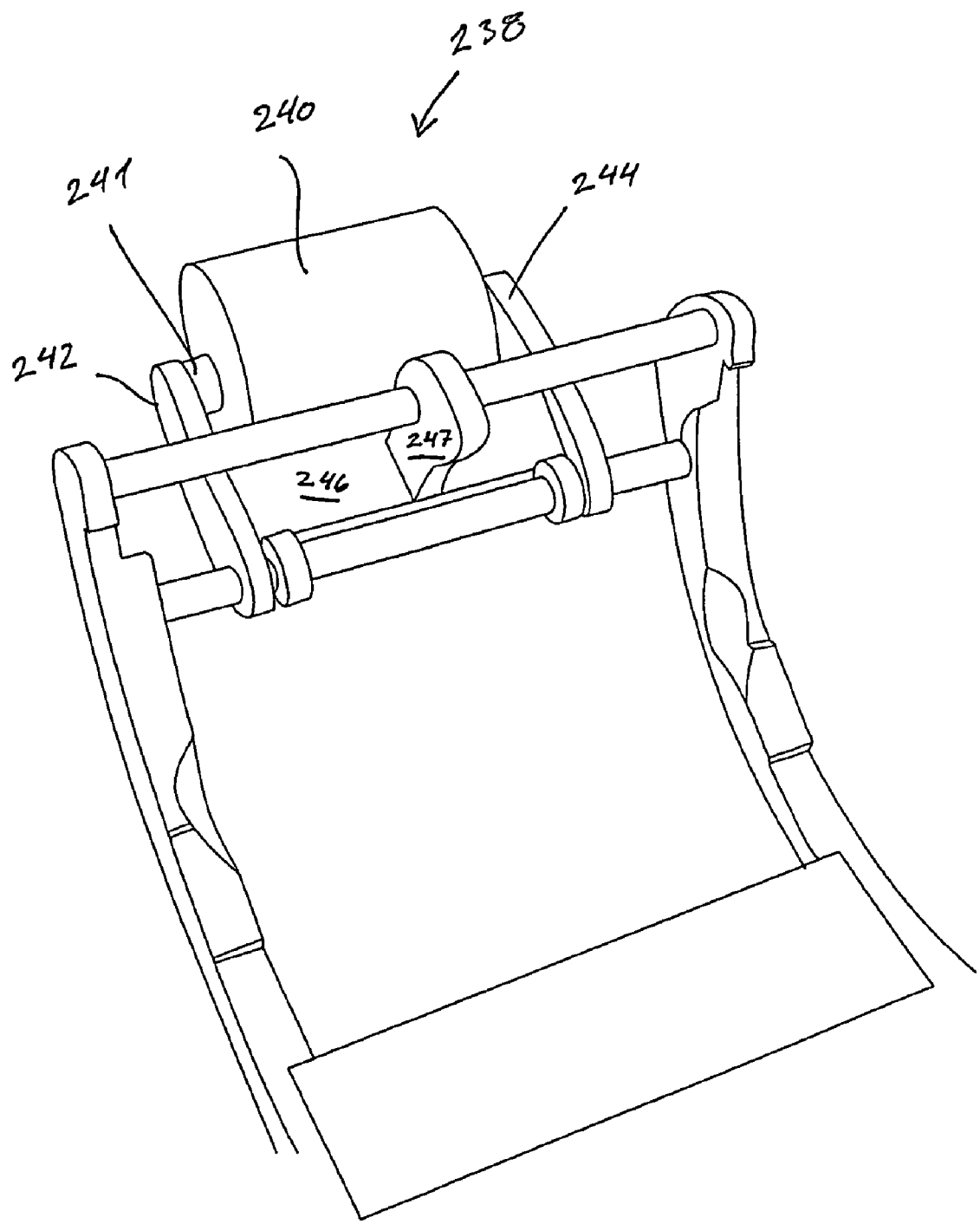
Figure 20:
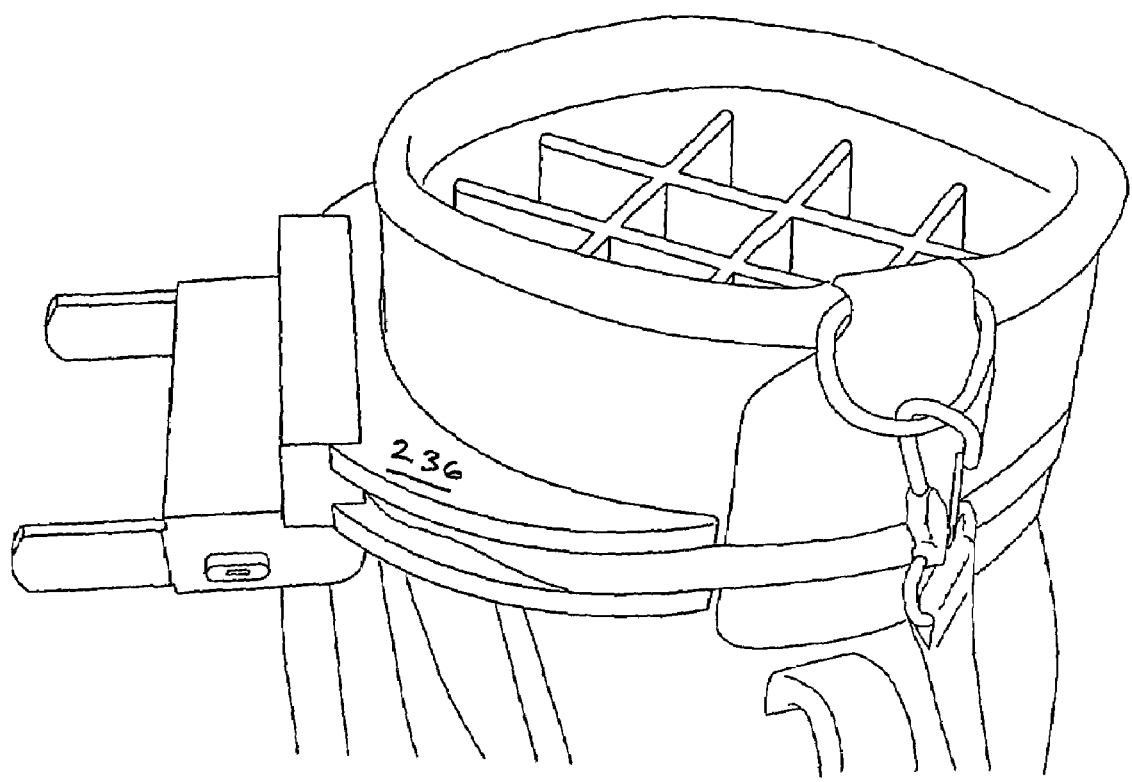

As shown in FIG. 13, a first step of unfolding the golf trolley comprises unfolding the casing 200 by rolling the casing on a surface whereby the frame members 203 change from defining a helical or a essentially cylindrical configuration to defining a longitudinal configuration as depicted in FIG. 14. The essentially cylindrical configuration corresponds to the collapsed and the first configuration. The longitudinal configuration corresponds to the unfolded/expanded configuration and the second configuration. In FIG. 14 the wheels and the support structure are removed. A golf-bag supporting member 236, which will be discussed further below in connection with FIG. 20, is also accommodated in the casing, along with a supporting wheel 238, cf. FIGS. 14 and 15, comprising a roller 240 rotatably mounted on a shaft 241, opposed ends of which are supported by respective mounting members 242,244. A support 246 interconnects the two mounting members 242,244. Each of the mounting members 242,244 are pivotally connected to a rod 224. In the use situation the support 246 abut an abutment member 247.

Figure 19:
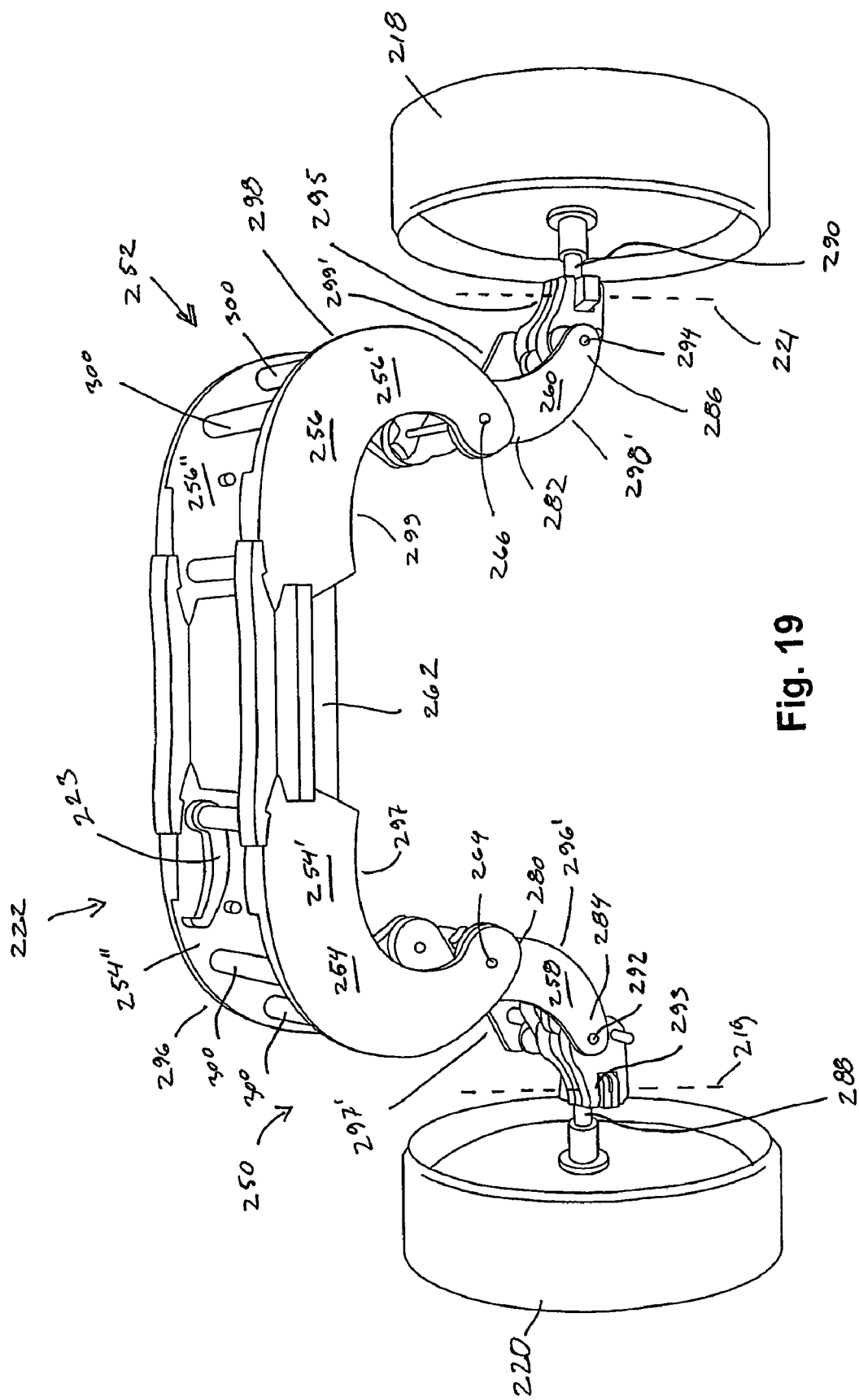

In FIG. 14, the frame members 203 are completely unfolded, and the wheels 218,220 as well as the wheel supporting structure 222 have been removed. As shown in FIG. 19, the wheel structure 222 comprises two arms 250,252, which define first arm sections 254,256 and second arm sections 258,260. Each of the first arm sections 254,256 is pivotally connected to a respective second arm section 258,260 around arm hinges 264,266.

On the attachment member 213 there is provided a first locking member 269 (e.g. a female locking part) which is adapted to be engaged by a second locking member 271 (e.g.

a male locking part) provided on the wheel structure 222. The locking members (269,271) are locked in relation to each other by introducing the projecting second member 271 into the cavity of the first member 269 and then turning the wheel structure 222 in relation to the attachment member 213.

Wheel hubs 219,221 are provided in the wheels for mounting thereof, cf. the more detailed description of the wheel structure set forth below.

Figure 16:
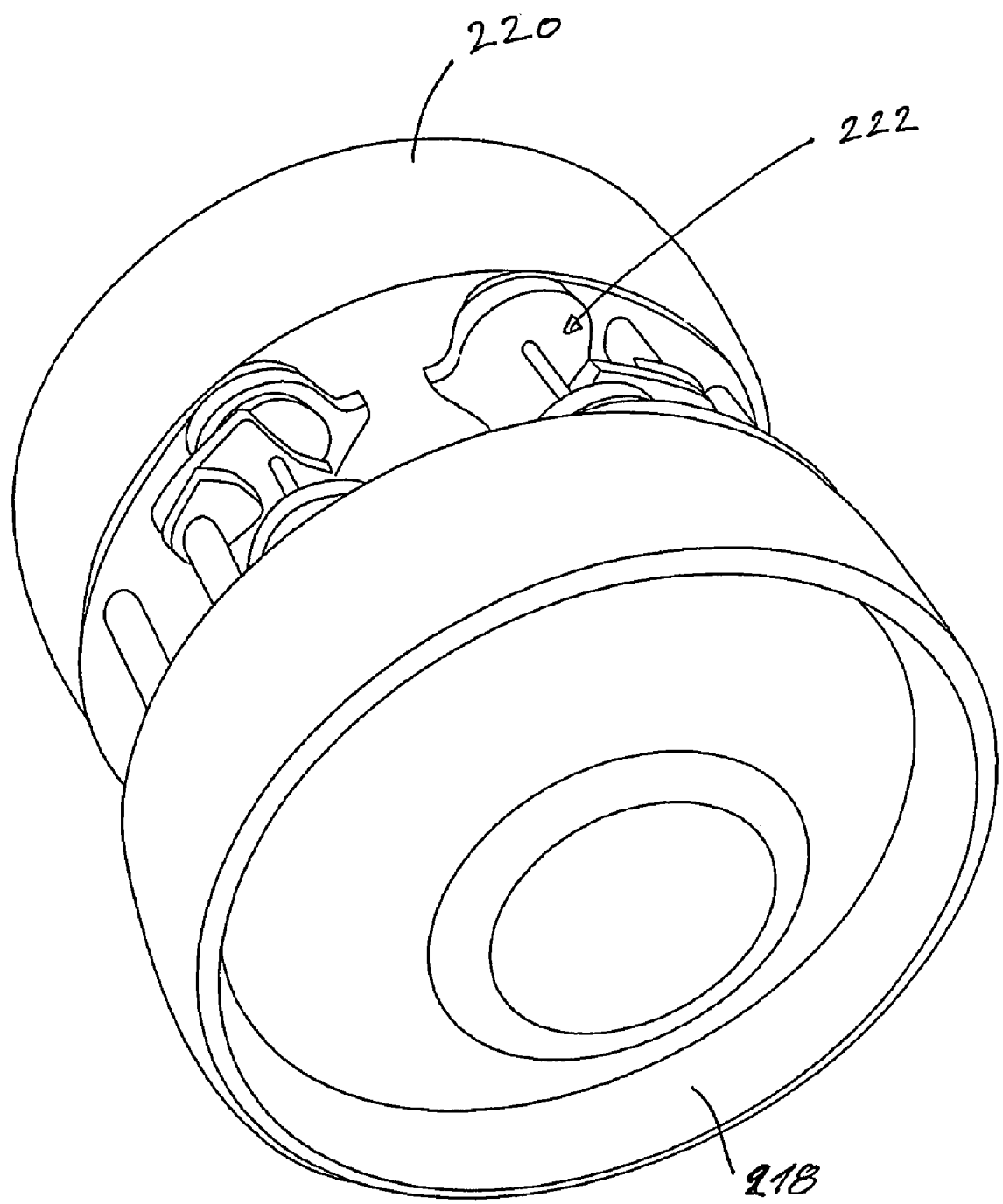
Figure 17:
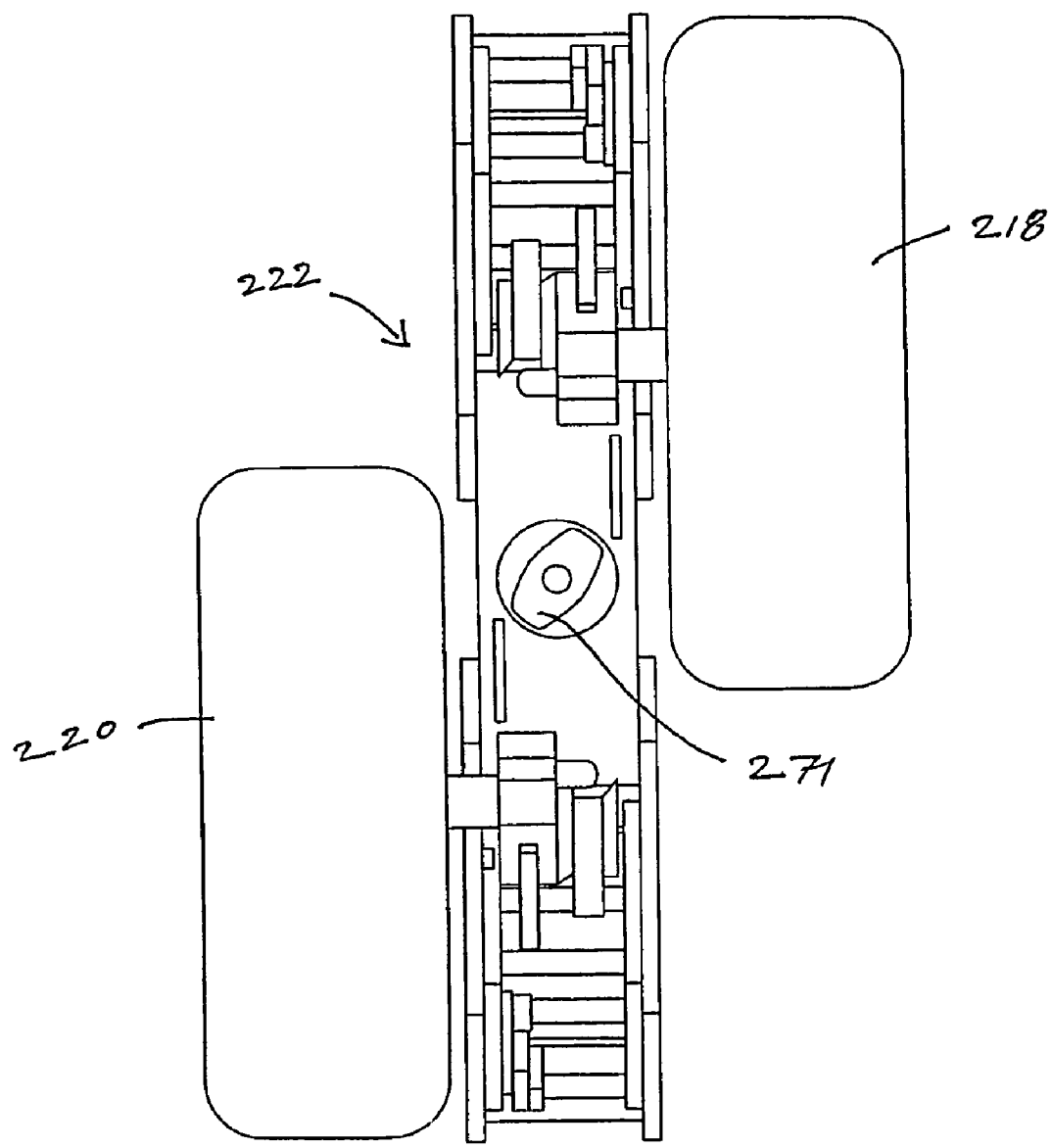
Figure 18:
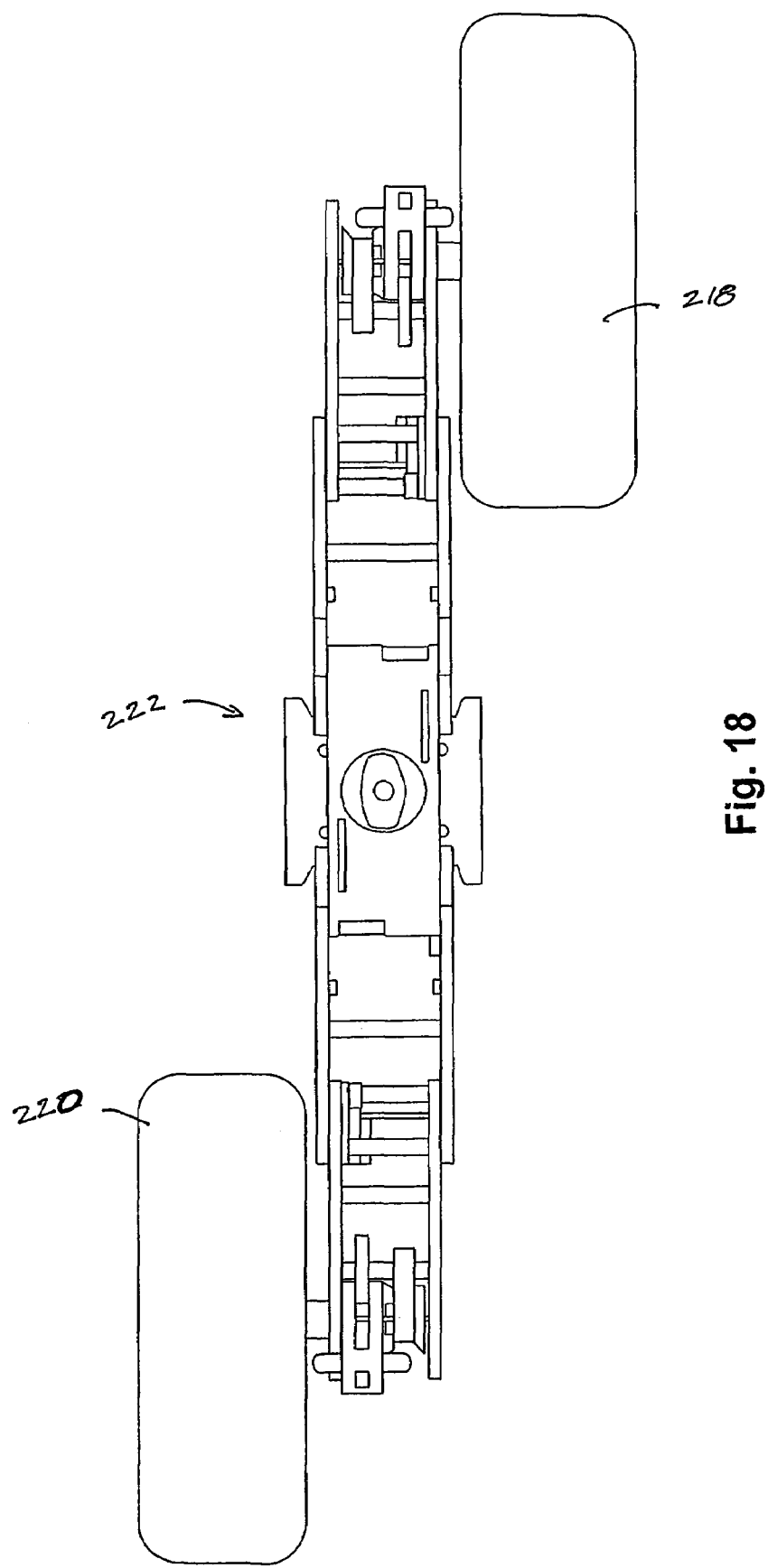

FIG. 19 illustrates the wheel structure 222 in its unfolded state. The process of unfolding is illustrated in FIGS. 16-19. In FIG. 16 the wheel structure is in its folded state. The wheel structure is unfolded by disengaging locking means 223 (see FIG. 19), whereby the arms 250,252 may be slid away from each other as shown in FIGS. 16-19. The arms 250,252 are pivotally received in grooves 261,263, which may be seen in FIG. 21, such that the arms may both be slid away from each other and rotated in relation to each other. When the arms 250,252 are slid away from each other the first arm sections 254,256 may be rotated in relation to the second arm sections 258,260, about hinges 264,266. Furthermore the wheels 218, 220 may be rotated from a position wherein they extend in a plane substantially parallel to a plane defined by the wheel structure 222 (as depicted in FIG. 18), to a position wherein they extend in a plane transverse to the plane defined by the wheel structure 222 (as depicted in FIG. 19). The axis of rotation of the wheels 218,220 are illustrated by axis 219,221.

In order to ensure a compact configuration when the trolley is folded into its cylindrical, folded configuration, the roller 240 (cf. FIG. 14) may have a width which does not exceed the distance between opposing surfaces of the wheels 218, 220, cf. FIG. 16, so that the roller 240 fits between the wheels in the cylindrical configuration depicted in FIG. 16.

It will be appreciated that the frame of the golf trolley comprises a plurality of frame members 203 which are unfolded and kept in place by tightening the wire 207 by means of tightening means 209 as illustrated in FIG. 21

The fully unfolded golf trolley is depicted in FIG. 21, in which the wheel structure is attached to an attachment member 213 by means of attachment means (not shown).

The wheel structure 222, which is a collapsible wheel structure of the second aspect of the invention, will now be described further with reference to FIG. 19. As shown each of the second arm sections 258,260 comprises a hinged end 280,282, at which the second arm sections 258,260 are hinged to the first arm sections 254,256. At opposite ends 284,286 of the second arm sections 258,260 there is provided means for supporting the wheels 218,220, such means comprising pivotally mounted rods 288,290 hinged at hinges 292,294 allowing rotation in the plane defined by the wheel structure and hinged at hinges 293,295 allowing rotation about axis 219, 221. When the wheel structure is to be unfolded, the first arm sections 254,256 are first slid away from each other and thereafter pivoted outwards. Then the second arm sections 258,260 are moved away from the first arm sections 254,256 by pivoting thereof around the arm hinges 264,266. Next, the rods 288,290 are rotated about axes 219,221 to the position shown in FIG. 19. In some embodiments the wheels are permanently coupled to the rods 288,290 while in other embodiments the wheels 118,120 are detachably mounted to the rods 188,190.

Each of the first and second arm sections are arc-shaped. Thereby, the first arm sections 254,256 define convex side surfaces 296,298 and concave side surfaces 297,299, cf. FIG. 19. Likewise, the second arm sections 258,260 define convex side surfaces 296',298' and concave side surfaces 297',299'. In the unfolded configuration shown in FIG. 19, the convex side surfaces 296',298' of the second arm sections 258,260 extend in continuation of the concave side surfaces 297,299 of the first arm sections 254,258, so that the arms 250,252 essentially define the form of an S in the unfolded configuration.

As shown in FIG. 19, the first arm sections 254,256 are defined by two mutually spaced arm members 254',254" and 256',256", between which a portion of each of the second arm sections 258,260 is received in the folded configuration. The spaced arm members 254',254" and 256',256" are interconnected by bars 300.

The invention claimed is:

1. A collapsible golf trolley, comprising:
a frame defined by at least two frame members, and
a wheel structure comprising a plurality of interconnectable wheel structure parts,
the at least two frame members being pivotally interconnected, whereby in a first configuration the two frame members define at least part of a casing for the wheel structure parts, the casing having a length which is shorter than the sum of the lengths of each of the frame members, and whereby in a second configuration the two frame members coextend in a longitudinal direction to define said frame,
wherein the wheel structure is collapsible and comprises at least two wheels and a wheel suspension structure, the collapsible wheel suspension structure having a first, collapsed configuration, in which the wheel suspension structure and the wheels may be accommodated in the casing, and a second, unfolded configuration, in which the wheel structure constitutes a support for the frame, and
wherein the wheel suspension structure has two supporting arms extending from and being interconnected at a centre element, whereby, in the unfolded configuration of the wheel structure, the supporting arms interconnect the wheels, the wheel structure being symmetrical around a central plane in the unfolded configuration.

2. A collapsible golf trolley according to claim 1, comprising at least four frame members, a first and a second of which, in the first configuration, defining a lower part of the casing, and a third and a fourth frame member defining an upper part of the casing in the first configuration.

3. A collapsible golf trolley according to claim 2, wherein the lower part of the casing is pivotally connected to the upper part around at least one first hinge arranged at one end of the casing, so that the casing may unfold from the first configuration into an intermediate configuration in which the frame members define a partially unfolded state of the trolley, the length of the trolley in the partially unfolded state being substantially twice the length of the casing.

4. A collapsible golf trolley according to claim 3, comprising a first locking device that mutually locks the upper and lower parts in the first configuration.

5. A collapsible golf trolley according to claim 3, wherein, in the intermediate configuration, the first and third frame member define a left part of the partially unfolded frame, and the second and fourth frame member define a right part of the partially unfolded frame, the left and right parts being pivotally interconnected around a second hinge arranged at one end of the partially unfolded frame, so that the partially unfolded frame may unfold from the intermediate configuration into the second configuration.

6. A collapsible golf trolley according to claim 5, comprising a second locking device that mutually locks the left and right parts in the second configuration.

7. A collapsible golf trolley according to claim 1, wherein an outer and/or inner surface of the casing essentially defines a shape of a cylinder.

8. A collapsible golf trolley according to claim 7, wherein the wheel structure parts comprises at least two wheels, each having an outer diameter which is equal to or smaller than the inner diameter of the cylinder.

9. A collapsible golf trolley according to claim 7, wherein each of the frame members includes an arc-shaped supporting member defining an end portion of each frame member.

10. A collapsible golf trolley according to claim 9, wherein each frame member comprises a plurality of longitudinally extending rods which are mutually secured by one or more of the arc-shaped supporting members which extend transversely to the rods.

11. A collapsible golf trolley according to claim 1, further comprising at least one golf-bag supporting member which is releasably attachable to at least one of the frame members, the dimensions of the golf-bag supporting member being such that it may be accommodated in the casing.

12. A collapsible golf trolley according to claim 1, further comprising a handle which is pivotally connected to one of the frame members, so that the handle, in one configuration, extends in the longitudinal direction, and in another configuration extends in a transverse direction, whereby the handle defines an end surface of the casing in the first configuration of the frame members, when the handle extends in the transverse direction.

13. A collapsible golf trolley according to claim 12, further comprising a supporting wheel which is releasably connectable to an end portion of the frame remote from the handle.

14. A collapsible golf trolley according to claim 1, wherein each arm comprises a first section which, in the unfolded configuration, is proximal with respect to the central plane, and a second section which, in the unfolded configuration, is distal with respect to said central plane, said centre element thereby interconnecting the respective first sections of the two arms.

15. A collapsible golf trolley according to claim 14, wherein the first and second sections of each arm are pivotally interconnected, so that the two sections of each arm extend away from the central plane in the unfolded configuration, the second section of each arm thereby defining a hinged end, at which the second arm section is hinged to the first arm section, and an opposite end, at which a supporting device supports one of the wheels.

16. A collapsible golf trolley according to claim 15, wherein said supporting device comprises a rod which is pivotally mounted to the second arm section.

17. A collapsible golf trolley according to claim 16, wherein said rod is pivotally mounted in such a manner that that one of the wheels, which is supported by the rod, is pivotal between a non-operating position, in which an axis of rotation of the wheel is transverse to the second arm section, and an operating position, in which the axis of rotation of the wheel forms an extension of the second arm section.

18. A collapsible golf trolley according to claim 14, wherein each of the first and second arm sections are arc-shaped to define respective convex side surfaces and concave side surfaces.

19. A collapsible golf trolley according to claim 18, wherein, in the folded configuration of each arm, the convex side surface of the second arm section essentially co-extends with the convex side surface of the first arm section, and wherein, in the unfolded configuration of each arm, the convex side surface of the second arm section extends in continuation of the concave side surface of the first arm section.

20. A collapsible golf trolley according to claim 18, wherein the arc-shaped arm sections have a maximum outer diameter in the folded configuration which is approximately equal to the outer diameter of the wheels and/or approximately equal to the inner diameter of the casing.

21. A collapsible golf trolley according to claim 14, wherein one of the arm sections of each arm is defined by two mutually spaced arm members, between which at least a portion of the other arm section is received in the folded configuration.

22. A collapsible golf trolley according to claim 1, wherein the supporting arms and the centre element are pivotable in relation to each other.

23. A collapsible golf trolley according to claim 1, wherein the supporting arms and the centre element are slidable in relation to each other.

24. A collapsible golf trolley according to claim 1, wherein the at least two frame members are hinged to each other so as to allow said members to be rolled into the first configuration so as to define an essentially cylindrical configuration.

25. A collapsible golf trolley according to claim 24, wherein the wheel structure parts comprises at least two wheels defining end surfaces of the essentially cylindrical configuration.

26. A collapsible golf trolley according to claim 25, wherein the at least two wheels are permanently attached to the wheel structure.

27. A collapsible golf trolley according to claim 24, further comprising a locking device that locks the at least two frame members in the second configuration.

28. A collapsible wheel structure for a mobile appliance, comprising:
at least two wheels;
a wheel supporting structure having two supporting arms extending from and being interconnected at a centre element, whereby, in an unfolded configuration of the wheel structure, the supporting arms interconnect the wheels, the wheel structure being symmetrical around a central plane in the unfolded configuration;
each arm comprising a first arm section which, in the unfolded configuration, is proximal with respect to the central plane, and a second arm section which, in the unfolded configuration, is distal with respect to said central plane, said centre element thereby interconnecting the respective first sections of the two arms;
the first and second sections of each arm being pivotally interconnected, so that the two sections of each arm extend away from the central plane in the unfolded configuration, the second section of each arm thereby defining a hinged end, at which the second arm section is hinged to the first arm section, and an opposite end, at which a supporting device supports one of the wheels,
wherein each of the first and second arm sections are arc-shaped to define respective convex side surfaces and respective concave side surfaces;
whereby, in the folded configuration, the opposite end of each of the second arm sections is closer to the centre element than the hinged end of the second arm section.

29. A collapsible wheel structure according to claim 28, wherein the supporting arms and the centre element are pivotable in relation to each other.

30. A collapsible wheel structure according to claim 28, wherein the supporting arms and the centre element are slidable in relation to each other.

31. A collapsible wheel structure according to claim 28, wherein, in the folded configuration of each arm, the convex side surface of the second arm section essentially co-extends with the convex side surface of the first arm section, and wherein, in the unfolded configuration of each arm, the convex side surface of the second arm section extends in continuation of the concave side surface of the first arm section, so that the arms essentially define the form of an S in the unfolded configuration.

32. A collapsible wheel structure according to claim 28, wherein the arc-shaped arm sections have a maximum outer diameter in the folded configuration which is approximately equal to the outer diameter of the wheels.

33. A collapsible wheel structure according to claim 28, wherein one of the arm sections of each arm is defined by two mutually spaced arm members, between which at least a portion of the other arm section is received in the folded configuration.

34. A collapsible wheel structure according to claim 28, wherein said supporting device comprises a rod which is pivotally mounted to the second arm section.

35. A collapsible wheel structure according to claim 34, wherein said rod is pivotally mounted in such a manner that that one of the wheels, which is supported by the rod, is pivotal between a non-operating position, in which an axis of rotation of the wheel is transverse to the second arm section, and an operating position, in which the axis of rotation of the wheel forms an extension of the second arm section.

36. A mobile appliance comprising a collapsible wheel structure according to claim 28.

* * * * *